United States Patent [19]

Nakamura

[11] Patent Number: 5,497,431
[45] Date of Patent: Mar. 5, 1996

[54] METHOD OF EXTRACTING CHARACTERISTIC IMAGE DATA AND COLOR DATA CONVERSION DEVICE FOR IMAGE PROCESSING APPARATUS

[75] Inventor: Hiroaki Nakamura, Kanagawa, Japan

[73] Assignee: Fuji Photo Film Co., Ltd., Kanagawa, Japan

[21] Appl. No.: 294,053

[22] Filed: Aug. 24, 1994

Related U.S. Application Data

[62] Division of Ser. No. 154,118, Nov. 18, 1993.

[30] Foreign Application Priority Data

Nov. 18, 1992 [JP] Japan .................................. 4-308963
Nov. 18, 1992 [JP] Japan .................................. 4-308964

[51] Int. Cl.⁶ ...................................................... G06K 9/46
[52] U.S. Cl. ...................................... 382/162; 358/520
[58] Field of Search .................................. 382/162, 163, 382/167; 358/518, 520; 348/34

[56] References Cited

U.S. PATENT DOCUMENTS

| | | | |
|---|---|---|---|
| 4,649,423 | 3/1987 | Hoffrichter | 358/520 |
| 4,668,979 | 5/1987 | Jung | 358/520 |
| 5,150,199 | 9/1992 | Shoemaker et al. | 358/518 |
| 5,202,935 | 4/1993 | Kanamori et al. | 382/162 |
| 5,278,921 | 1/1994 | Nakamura | 358/527 |
| 5,398,121 | 3/1995 | Kowalewski | 358/504 |
| 5,442,717 | 8/1995 | Murakami | 382/162 |

FOREIGN PATENT DOCUMENTS

| | | |
|---|---|---|
| 52-156624 | 12/1977 | Japan . |
| 52-156625 | 12/1977 | Japan . |
| 53-12330 | 2/1978 | Japan . |
| 53-145620 | 12/1978 | Japan . |
| 53-145621 | 12/1978 | Japan . |
| 53-145622 | 12/1978 | Japan . |
| 62-115430 | 5/1987 | Japan . |
| 62-115431 | 5/1987 | Japan . |
| 62-115432 | 5/1987 | Japan . |
| 62-189456 | 8/1987 | Japan . |
| 62-189457 | 8/1987 | Japan . |
| 63-138340 | 6/1988 | Japan . |
| 63-178222 | 7/1988 | Japan . |

*Primary Examiner*—Yon J. Couso
*Attorney, Agent, or Firm*—Sughrue, Mion, Zinn, Macpeak & Seas; Richard C. Turner

[57] ABSTRACT

A method of extracting characteristic image data by dividing, on the basis of hues, an original image into color regions, and after regions which contact an outer edge of the original image have been eliminated, extracting regions likely to be face regions; and a color data conversion device for an image processing apparatus in which lightness values are determined by simple calculation on the basis of data of respective colors which have been photometrically measured, and hue values and saturation values are outputted by use of tables. Characteristic image data of the original image can be extracted with high precision, and calculating time for converting the data of the respective colors, which have been photometrically measured, into hue, saturation and lightness can be reduced.

6 Claims, 22 Drawing Sheets

ORIGINAL IMAGE

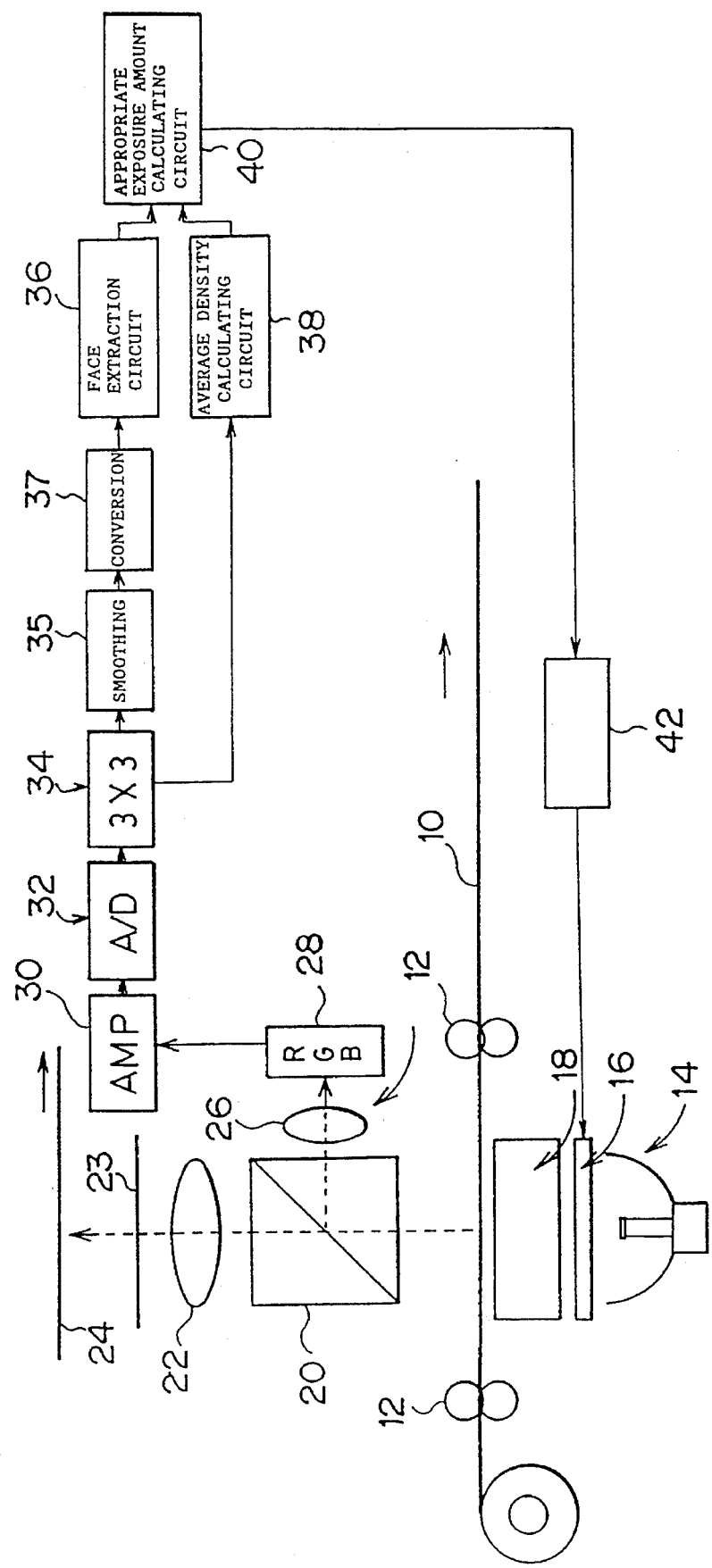

ORIGINAL IMAGE

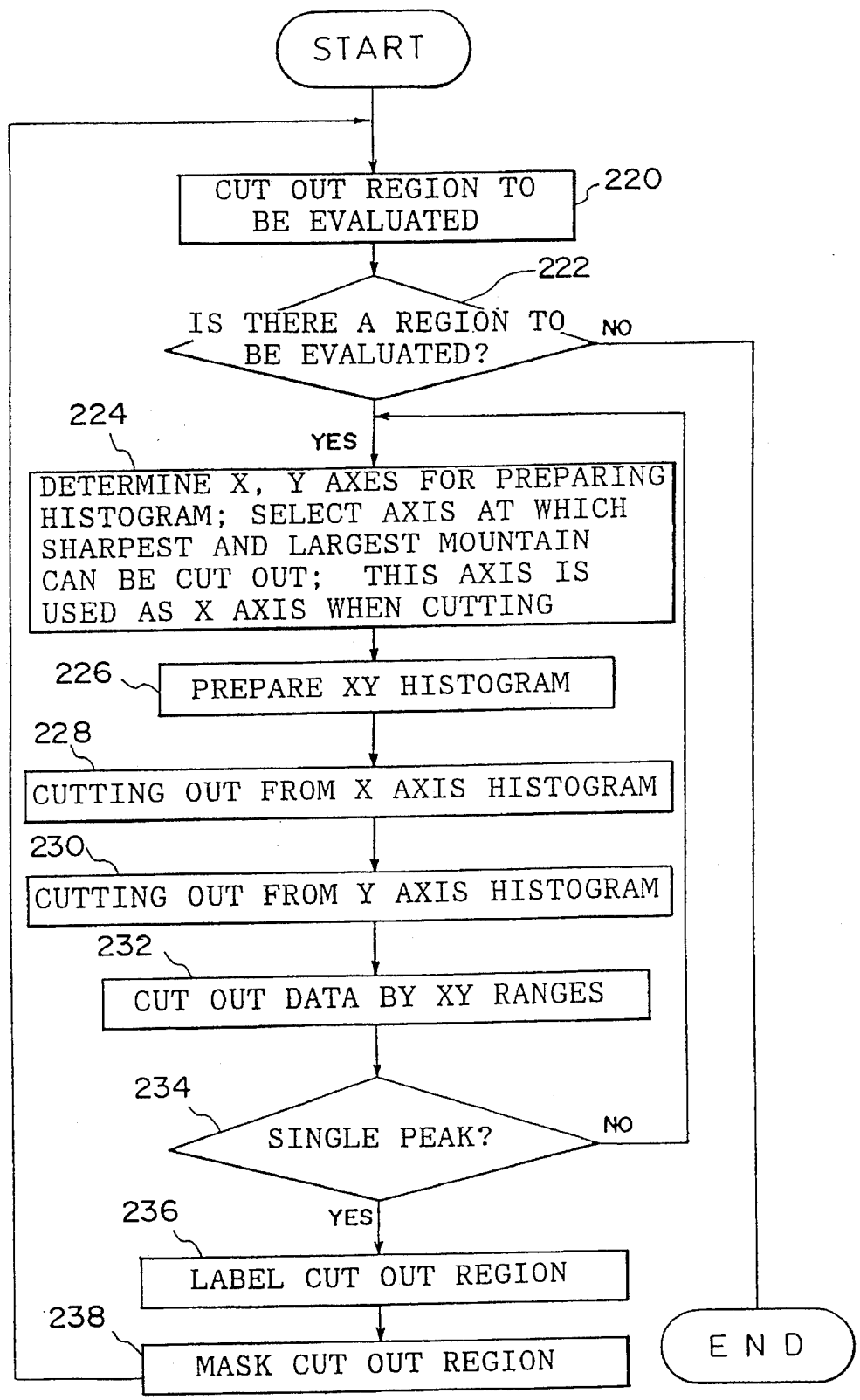

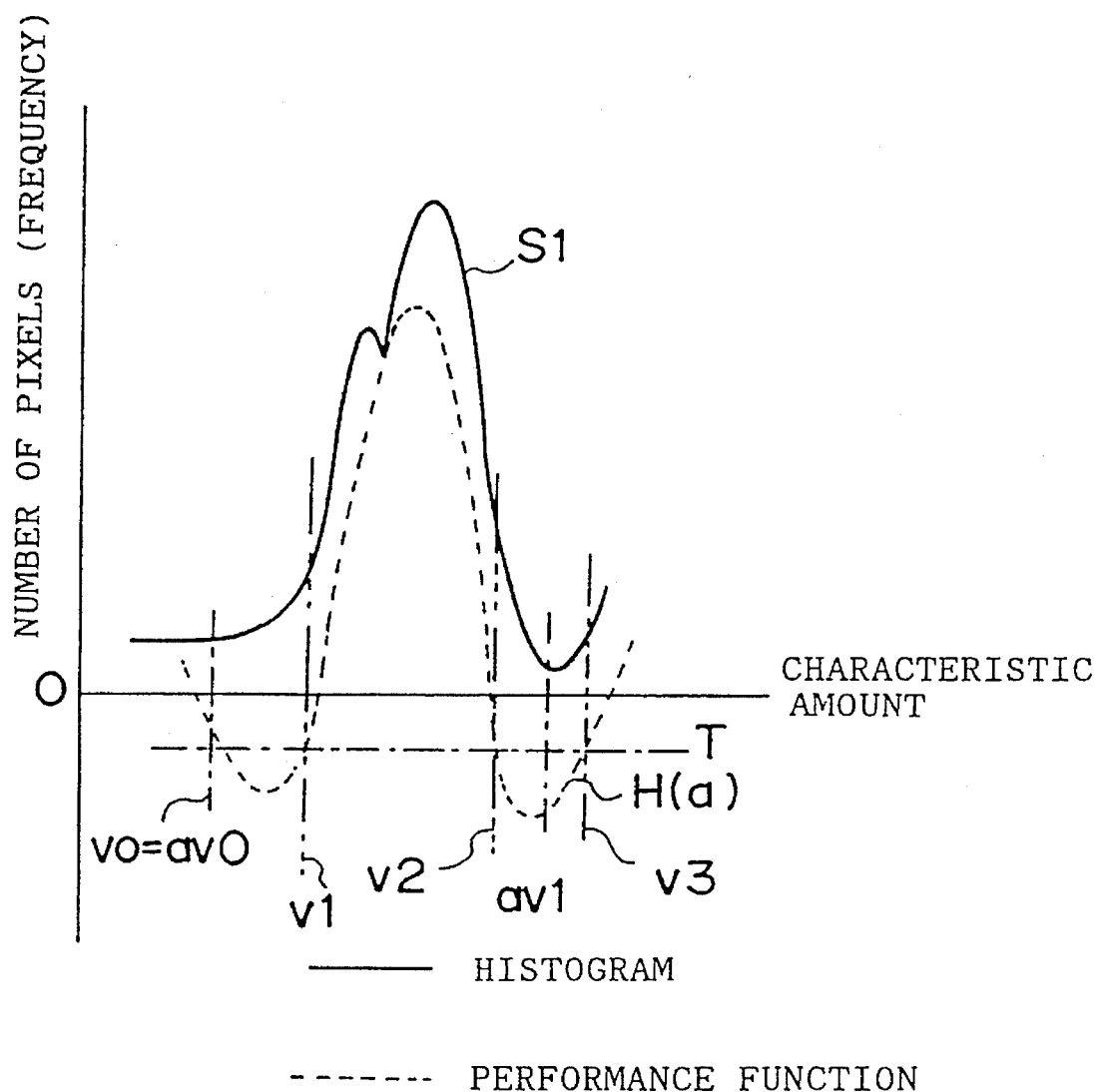

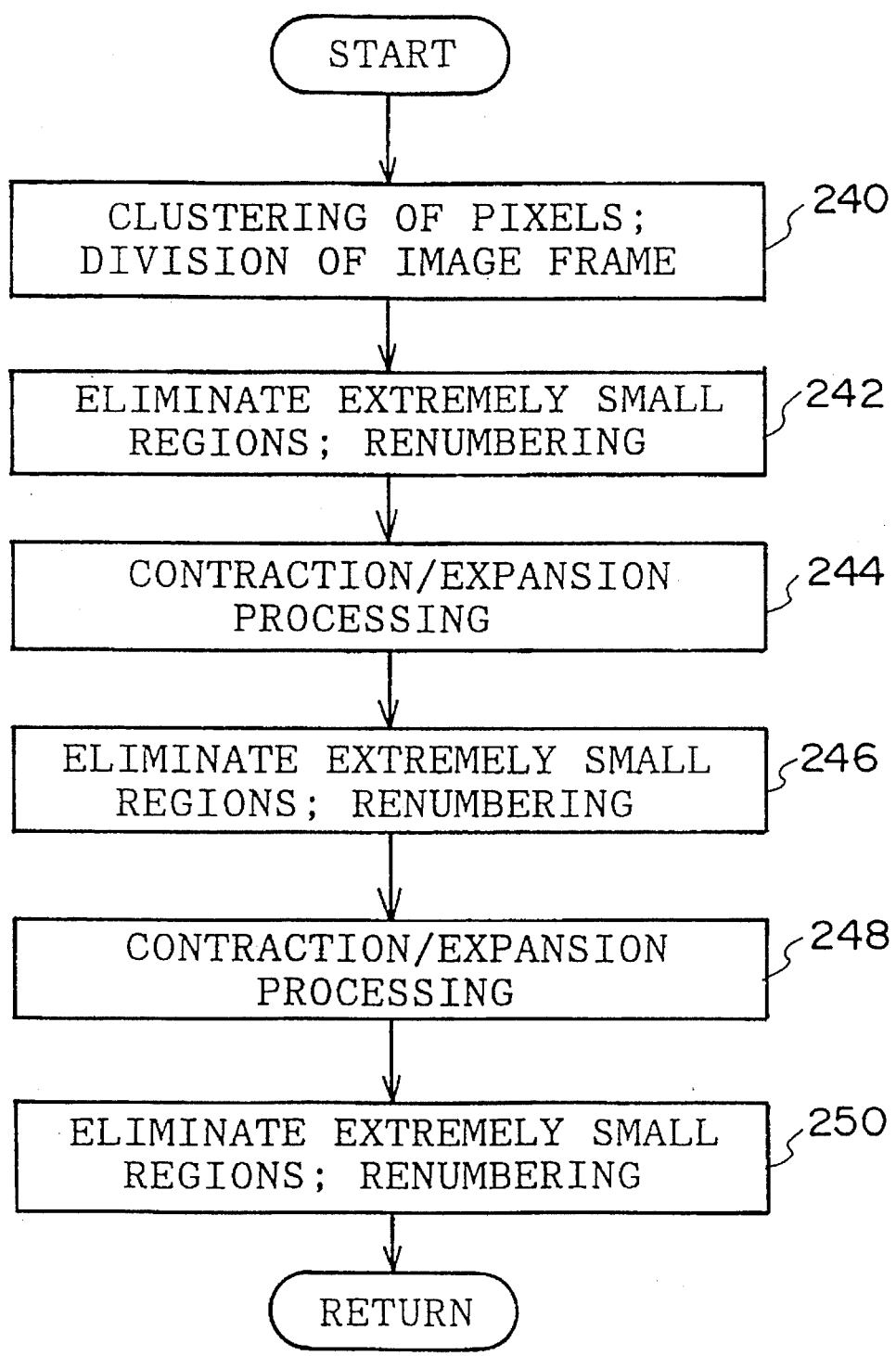

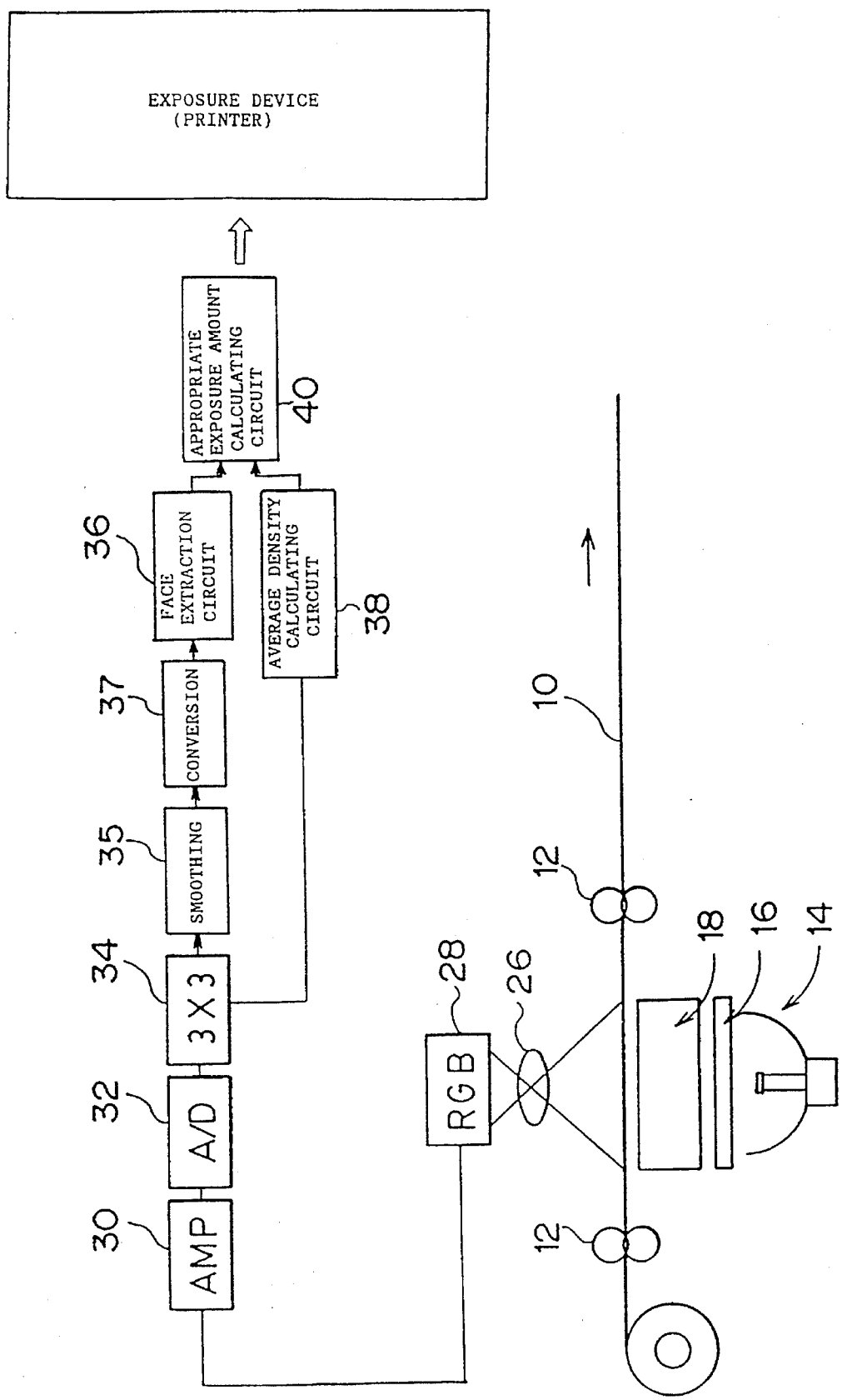

METHOD OF EXTRACTING CHARACTERISTIC IMAGE DATA AND COLOR DATA CONVERSION DEVICE FOR IMAGE PROCESSING APPARATUS

This is a divisional of application Ser. No. 08/154,118 filed Nov. 18, 1993 now pending.

BACKGROUND OF THE INVENTION

1. Field of the Invention

The present invention relates to a method of extracting characteristic image data, and more specifically, to a method of extracting characteristic image data, such as density data or the like of a human face, which is used when a color original image is copied onto a color copy material or a black-and-white copy material.

The present invention also relates to a color data conversion device for an image processing apparatus, and in particular, to a color data conversion device for an image processing apparatus in which color data obtained from a color original image is converted into hue values, saturation values, and lightness values.

2. Description of the Related Art

When a photograph of a person is viewed, the area which is most noticed is the person's face. In order to produce high-quality photographs, it is necessary to print the color and the density of a human face at an appropriate color and an appropriate density.

Conventionally, a face region in an original image of a color film is designated by a light pen, and the density data of the human face is extracted. The amount of exposure is determined based on the extracted density data so that the color of the face is printed appropriately. Such technology is disclosed in Japanese Patent Application Laid-Open Nos. 62-115430, 62-115431, 62-115432, 62-189456, 62-189457, 63-138340, and 63-178222.

However, in the above-described conventional art, there is a drawback in that the printing operation requires much time because an operator must use the light pen to designate the face region of each image. Further, automatization of the technology is difficult because an operator must view the image and designate the face region.

Methods of automatically extracting human face data have been proposed. For example, Japanese Patent Application Laid-Open Nos. 52-156624, 52-156625, 53-12330, 53-145620, 53-145621, and 53-145622 disclose the following method in which human face data is extracted by the extraction of flesh color data. Namely, a color original image is divided into a plurality of points to be photometrically measured. Each of the points to be photometrically measured is divided into three colors of R (red), G (green), and B (blue) which are photometrically measured. A determination is made as to whether the color of each photometrically measured point calculated from the photometric data falls within a flesh color range. A cluster (group) of photometrically measured points which have been determined to be within a flesh color range are used for face density data.

However, in this method, because a color within a flesh color range is used as face density data, regions, which are not face regions and which are flesh color regions such as the ground, tree trunks, clothes, and the like or are regions of a color which is similar to a flesh color, are extracted as density data. Further, even if the same subject is photographed under the same conditions, the hue of the photographed image differs in accordance with the type of film used. Therefore, when the type of film differs, there are cases in which the face density data cannot be extracted automatically. Moreover, when the color of the light source which illuminates the subject is different, the hue of the photographed image differs (e.g., an image photographed with fluorescent light as the light source may be greenish). Therefore, when the light source color differs, there are cases in which the face density data cannot be extracted automatically.

In order to solve the above-mentioned drawback which arises when the light source color differs, the photometric data of the flesh color ranges may be extracted after light source color correction is effected. Light sources can be divided broadly into sunlight, fluorescent light, and tungsten light. However, when sunlight is the light source, the hue differs in accordance with the season and the time of day. Even if the season and the time are the same, the hue differs in accordance with direct or indirect light. Further, with artificial light sources such as fluorescent light, hues vary greatly as there are various types of manufactured light sources. Accordingly, it is difficult to designate the type of light source and effect light source correction for each light source. Even if color correction could be effected perfectly, extraction could not be effected such that flesh color regions such as the ground, tree trunks or the like or regions of a color similar to a flesh color were not extracted, and cases in which the types of films differ could not be addressed.

Conventionally, there exist image processing apparatuses such as image displaying devices, image recording devices and the like. In an image displaying device, an image is read from a color original image such as a film, a print or the like, and the color original image is reproduced and displayed on the basis of the read data. In an image recording device, on the basis of the read data, an amount of exposure is determined and an image is recorded so that the color original image is reproduced.

For example, the density data of a main image, such as a human face or the like, on an original image of a color film is extracted. Based on the extracted density data, an amount of exposure is determined such that the face color is printed appropriately. Such technology is disclosed in Japanese Patent Application Laid-Open Nos. 62-115430, 62-115431, 62-115432, 62-189456, 62-189457, 63-138340 and 63-178222.

Generally, in image processing apparatuses such as those described above, in order to facilitate calculation for determining a composite color when color correction of the color original image is effected and in order to facilitate calculation for determining the tone of the color original image, R data, G data, B data expressing the densities of the three colors of red light, green light and blue light (i.e., the three primary colors R, G, B) are converted into H data, S data, and L data respectively expressing hue (H), saturation (S), and lightness (L) which are used in a color development system.

Known methods of conversion include conversion by use of a HSL hexagonal pyramid, and conversion based on the definitions of Hayden and Reins.

However, due to complex calculation using various arithmetic expressions, the processing times of the above-mentioned conversions are long. Accordingly, in an image processing apparatus, the processing time required for conversion alone is long. A drawback arises in that when this processing time is added to the time for fundamental processing of the image, the entire processing time of the processing apparatus greatly increases.

In order to solve this drawback, the calculating time can be reduced by using a high-speed type CPU. However, this results in increasing the cost of the processing apparatus. Further, the results of calculation for the above-mentioned conversions are stored in tables in advance, and the respective HSL data corresponding to the RGB data can be output by using these tables. In this way, because calculation at the time of conversion is not used, the calculating time is shortened, and processing at the apparatus can be expedited.

However, in order to output the respective HSL data corresponding to the combinations of the respective RGB data, it is necessary to provide respective tables for H, S, L. Further, the number of indices which designate the output data of the tables is the number of combinations of respective R, G, B data. Therefore, the storage capacity is large. Namely, in order to decrease the difference between densities of an image, the gradations of the image are increased. For example, when the gradations of the image are expressed by 8 bits (0 to 255), indices of $(2^8)^3$ bits are required for the respective tables for outputting the HSL data. Accordingly, when the respective HSL output data are 8 bits, the storage capacity of each table is approximately $(2^{24})$ bytes. Accordingly, an extremely large capacity of approximately 50 megabytes, i.e., $(2^{24})$ 3, is needed for all of the respective HSL tables, which is impractical.

SUMMARY OF THE INVENTION

In view of the aforementioned, an object of the present invention is to provide a method of extracting characteristic image data in which only characteristic image data such as human face data is automatically extracted with high accuracy from a color original image such as a negative film.

Another object of the present invention is to provide a color data conversion device for an image processing apparatus which is quick and inexpensive, and in which data representing densities of colors, such as red light, green light, blue light and the like, of a color original image can be converted into data representing hue, saturation, and lightness.

In order to achieve the above-described object, a first aspect of the present invention is a method of extracting characteristic image data including the steps of: dividing a color original image into a plurality of pixels, breaking down each of the pixels into three colors of red light, green light and blue light, and photometrically measuring the red light, green light and blue light; dividing, on the basis of data obtained by photometry, the color original image into color regions having the same or similar hue values; and selecting at least one color region, which is a divided color region and which is a color region other than color regions which contact an outer edge of the color original image, and extracting data of the selected divided region as characteristic image data. The color original image may be divided into color regions having the same or similar hue values and saturation values.

In the above aspect, when a region is selected, a determination is made as to whether the divided region is a human face. By selecting a region which is determined to be a human face, density data of a human face can be extracted as characteristic image data.

The color original image is divided into a plurality of pixels, and each of the pixels is broken down into three colors of red light, green light and blue light, and the red light, green light and blue light are photometrically measured. On the basis of data obtained by photometry, the color original image is divided into color regions having same or similar hue values. Accordingly, pixels within a predetermined range of the same or similar hue values are included within one color region on the color original image. A region of notice, which expresses a characteristic of the color original image, is usually located in a vicinity of the center of a color original image. Therefore, if at least one color region, of the divided color regions of the color original image, is selected from color regions other than those which contact the outer edge of the color original image, the data of the selected color region represents characteristic image data. Therefore, by selecting a color region other than color regions which contact the outer edge of the color original image, characteristic image data can be extracted.

When there are variations in the type of film or the type of light source, variations in the film due to the passage of time, differences in the developing of films or the like, the hue of the color original image varies uniformly over the entire frame. However, because the hue varies over the entire frame, even if the hue of ranges of color regions of the original color image having the same or similar hue values varies, there is no variation in the hue of the entire frame. Accordingly, in the present invention, characteristic image data can be extracted even if the hue of the color original image varies due to variations in the type of film or the type of light source, variations in the film due to the passage of time, differences in the developing of films or the like.

In a case in which the hue of the characteristic image, which is a characteristic area of the image, is the same or similar to the hues of other areas, if the color original image is divided on the basis of the similarity of the hue values alone, the characteristic image is indistinguishable from the other areas. Therefore, saturation values are derived in addition to the hue values, and the color original image is divided into color regions having the same or similar hue values and saturation values. At least one color region is selected from the color regions, of the divided color regions, other than color regions which contact the outer edge of the color original image, and characteristic image data is extracted. By using hue values and saturation values, even if there are areas having the same or similar hue values as the hue value of the characteristic image, characteristic image data can be extracted.

When a photograph of a person is viewed, the region which is most noticed is the face of the person. Therefore, it is preferable that a determination is made as to whether a divided region of the color original image is a human face and that data of the region determined to be a human face is extracted as characteristic image data. For example, the hue of a face of a person of Asian descent may be similar to the hue of flesh color portions of the ground, trees or the like. However, the saturation values thereof usually differ. Therefore, if data is extracted from color regions other than color regions which contact the outer edge of the color original image and in which the hue value or the hue value and the saturation value are the same or similar, the ground trees and the like which contact the outer edge of the color original image, such as the background, can be excluded, and human face data can be extracted even from images in which faces, the ground, trees and the like are included.

Further, data which is extracted as characteristic image data may be data other than human face data.

In accordance with the above-described aspect, data is extracted, on the basis of hue values, from color regions other than color regions which contact the outer edge of the original image. Therefore, data of a characteristic image of the original image can be extracted with high accuracy.

Further, data is extracted, on the basis of hue values and saturation values, from color regions other than color regions contacting the outer edge of the original image. Therefore, even if there are areas having the same or similar hue values, data of a characteristic image of the original image can be extracted with high accuracy.

A second aspect of the present invention is a color data conversion device for an image processing apparatus including: color data outputting means for dividing a color original image into a plurality of pixels, breaking down each of the pixels into three colors of red light, green light and blue light, photometrically measuring the red light, green light and blue light, and outputting color data of the three colors; calculating means for standardizing at least two color data, and outputting standardized color data; lightness conversion means for calculating a lightness value on the basis of color data of the three colors, and outputting the lightness value; saturation conversion means, provided with a saturation table expressing relationships between the standardized color data and saturation values of the pixels, for outputting saturation values corresponding to inputted standardized color data; and hue conversion means, provided with a table expressing relationships between the standardized color data and hue values of the pixels, for outputting hue values corresponding to inputted standardized color data.

The calculating means may effect standardization at a value which is a predetermined multiple of the lightness value.

Further, the amount of standardized color data inputted into the saturation table may be smaller than the amount of standardized color data inputted into the hue table.

In the color data conversion device for an image processing apparatus of the second aspect, the color data outputting means divides a color original image into a plurality of pixels, breaks down each of the pixels into three colors of red light, green light and blue light, photometrically measures the red light, green light and blue light, and outputs color data of the three colors. The calculating means standardizes at least two color data and outputs the standardized color data. All three colors of red light, green light, and blue light may be used for the standardized color data, or any combination of two of the three colors of red light, green light and blue light may be used. The lightness conversion means calculates a lightness value on the basis of color data of the three colors and outputs the lightness value. For example, an average value of the color data of the three colors may be determined, and this average value can be outputted as the lightness value. Further, the color data conversion device for an image processing apparatus includes a saturation conversion means having a saturation table and a hue conversion means having a hue table. The saturation table expresses relationships between standardized color data and saturation values of the pixels. The saturation conversion means outputs saturation values corresponding to inputted standardized color data. The hue table expresses relationships between standardized color data and hue values of the pixels. The hue conversion means outputs hue values corresponding to inputted standardized color data. For example, the standardized color data can be used as indices of the hue table and the saturation table. In this way, in the color data conversion device for an image processing apparatus, a lightness value is determined for each pixel of the color original image by calculation from the color data of the three colors. Further, hue values and saturation values are outputted from the hue table and the saturation table by use of standardized color data in which color data of at least two colors is standardized. Accordingly, the calculation required by conventional conversions becomes a simple calculation for determining the lightness value, and there is no increase in the conversion time. Further, because the hue values and saturation values are obtained by using standardized data of at least two colors, there is no increase of capacity due to providing respective tables for lightness, hue and saturation, and inputting color data of three colors of red light, green light and blue light.

Standardization may be effected at a value which is a multiple of the lightness value. In this way, even if color data of two colors is standardized, components of the three colors of red light, green light and blue light are included if the two standardized color data are used, and the amount of data when the hue table and the saturation table are designated can be reduced.

Subtle variations in saturation are not revealed as much as subtle variations in hue. Accordingly, there are cases in which the need for resolution of the saturation values is less than that for hue values. Therefore, the amount of standardized data inputted into the saturation table is less than the amount of standardized data inputted into the hue table. In this way, the respective sizes of the hue table and the saturation table can be made different, and the tables can be set in accordance with the resolutions of the respective values during conversion.

In accordance with the above-described aspect, the lightness value is determined by a simple calculation based on the data of the respective colors which were photometrically measured, and the hue values and the saturation values are output from the tables. Therefore, an excellent effect is achieved in that optimal conversion data can be output without an increase in the calculating time for converting the data of the respective colors which were photometrically measured into hue, saturation and lightness.

Further, saturation values and hue values can be obtained from a hue table and a saturation table by standardized color data in which color data of at least two colors is standardized. Therefore, an excellent effect is achieved in that the storage capacity of the respective tables can be made optimal.

BRIEF DESCRIPTION OF THE DRAWINGS

FIG. 13 is a schematic view illustrating a printer relating to a second embodiment of the present invention.

FIG. 17 is a line diagram illustrating details of step 206 in FIG. 15.

FIG. 18 is a line diagram illustrating a histogram and a performance function.

FIG. 19 is a line diagram illustrating details of step 208 in FIG. 15.

FIG. 20 is schematic view of an exposure amount calculating device to which the present invention is applied.

DESCRIPTION OF THE PREFERRED EMBODIMENTS

Figure 1:
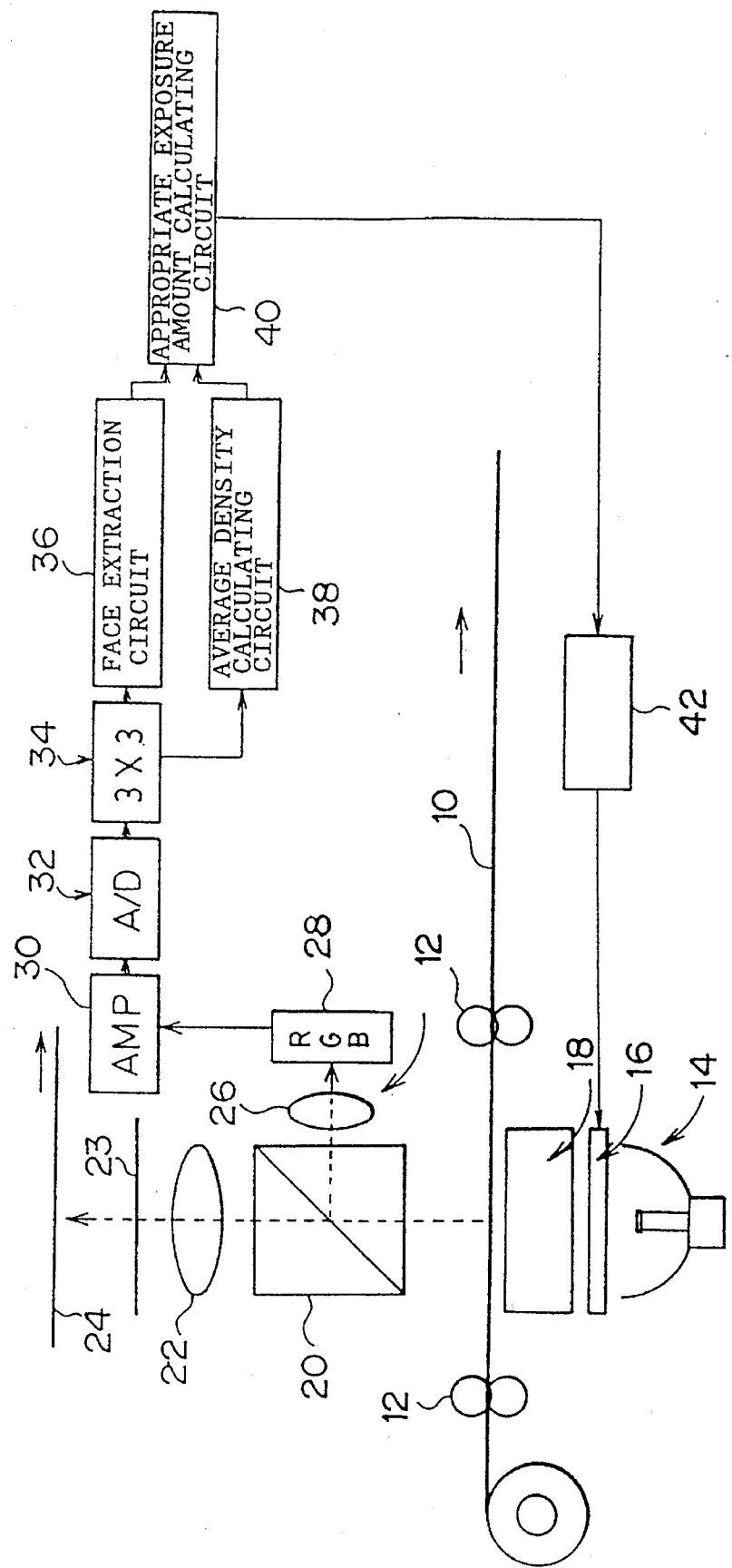
FIG. 1 is a schematic view illustrating a printer relating to a first embodiment of the present invention.

A first embodiment of the present invention will be described in detail with reference to the drawings. In the present embodiment, the present invention is applied to an automatic printer. As illustrated in FIG. 1, the automatic printer of the present embodiment is equipped with conveying rollers 12 which convey a color negative film 10. A light source 14, a color correction filter 16 such as a light-adjusting filter and a diffusion box 18 are disposed in that order beneath the color negative film 10 which is being conveyed by the conveying rollers 12. A distribution prism 20 which distributes in two directions the light transmitted through the negative film 10 is disposed above the negative film 10. A projecting optical system 22, a black shutter 23, and a color paper (photographic printing paper 24) are disposed in that order on one of the optical paths distributed by the distribution prism 20. A projecting optical system 26 and a CCD image sensor 28 are disposed in that order on the other optical path. The CCD image sensor 28 divides an entire single image (single frame) of the negative film 10 into a plurality of pixels (for example, 256×256 pixels), divides each pixel into R (red), G (green) and B (blue), and photometrically measures the R, G, B. The CCD image sensor 28 is connected, via an amplifier 30 which amplifies the output of the CCD image sensor and an analog-digital (A/D) converter 32, to a 3×3 matrix circuit 34 for correcting the sensitivity of the CCD image sensor 28. The 3×3 matrix circuit 34 is connected to an appropriate exposure amount calculating circuit 40 via a face extraction circuit 36 which is formed of a microcomputer in which a program of a routine, which will be described later, is stored. Further, the 3×3 matrix circuit 34 is connected to the appropriate exposure amount calculating circuit 40 via an average density calculating circuit 38 which calculates an average density of an entire single image. The appropriate exposure amount calculating circuit 40 is connected to the color correction filter 16 via a driver 42 which drives the color correction filter 16.

Next, operation of the present embodiment will be described. Light irradiated from the light source 14 is transmitted through the color correction filter 16, the diffusion box 18, and the color negative film 10, is distributed by the distribution prism 20, and is received by the CCD image sensor 28 via the projecting optical system 26. At this time, the black shutter 23 is closed. The CCD image sensor 28 receives the light, divides an entire single image into a plurality of pixels, divides each pixel into the three colors of R, G, B, photometrically measures the R, G, B, and outputs a photometric data signal. After the photometric data signal is amplified at the amplifier 30, the signal is converted into a digital signal at the A/D converter 32. Correction of the sensitivity of the image sensor is effected at the 3×3 matrix circuit 34, and the photometric data signal is input to the face extraction circuit 36 and the average density calculating circuit 38. The average density for one entire image is calculated at the average density calculating circuit 38. At the face extraction circuit 36, a region of a face of a human in an image is estimated, and the photometric data of the three colors R, G, B of the region assumed to be the face is output, as will be explained later. The exposure amount calculating circuit 40 uses the three color photometric data, which was outputted from the face extraction circuit 36, and the average density, which was determined at the average density calculating circuit 38, to calculate the amount of exposure. The exposure amount calculating circuit 40 controls the color correction filter 16 via the driver 42 and opens and closes the black shutter 23 so that printing is effected. When the average density calculated at the average density calculating circuit 38 is used, the exposure correction amount with respect to the average density can be determined. If the exposure correction amount is not determined, the average density calculating circuit 38 does not have to be employed, and the amount of exposure may be determined directly from the three color photometric data outputted from the face extraction circuit 36.

Figure 2:
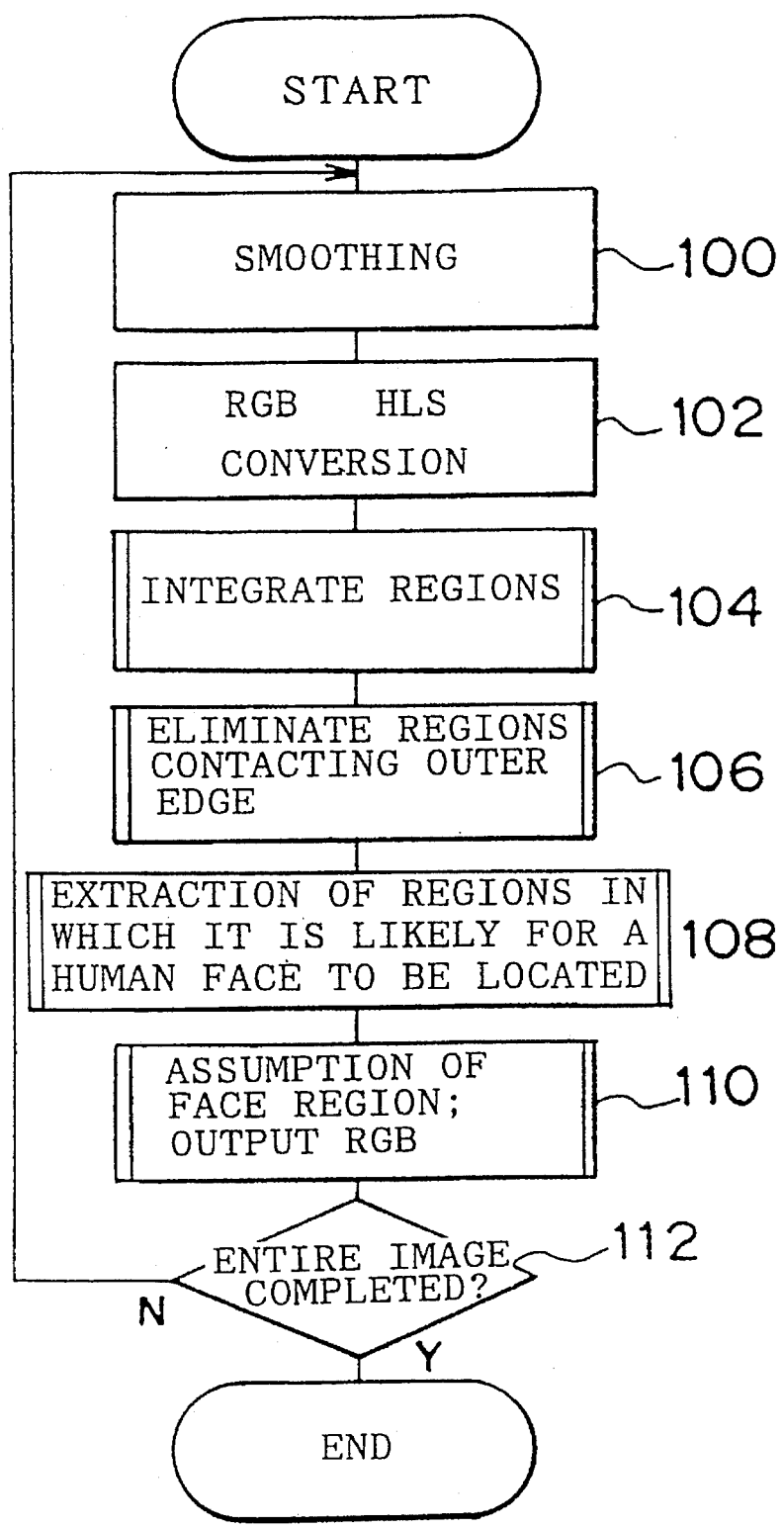
FIG. 2 is a flow diagram illustrating a face extraction routine of a face extraction circuit.
Figure 3:
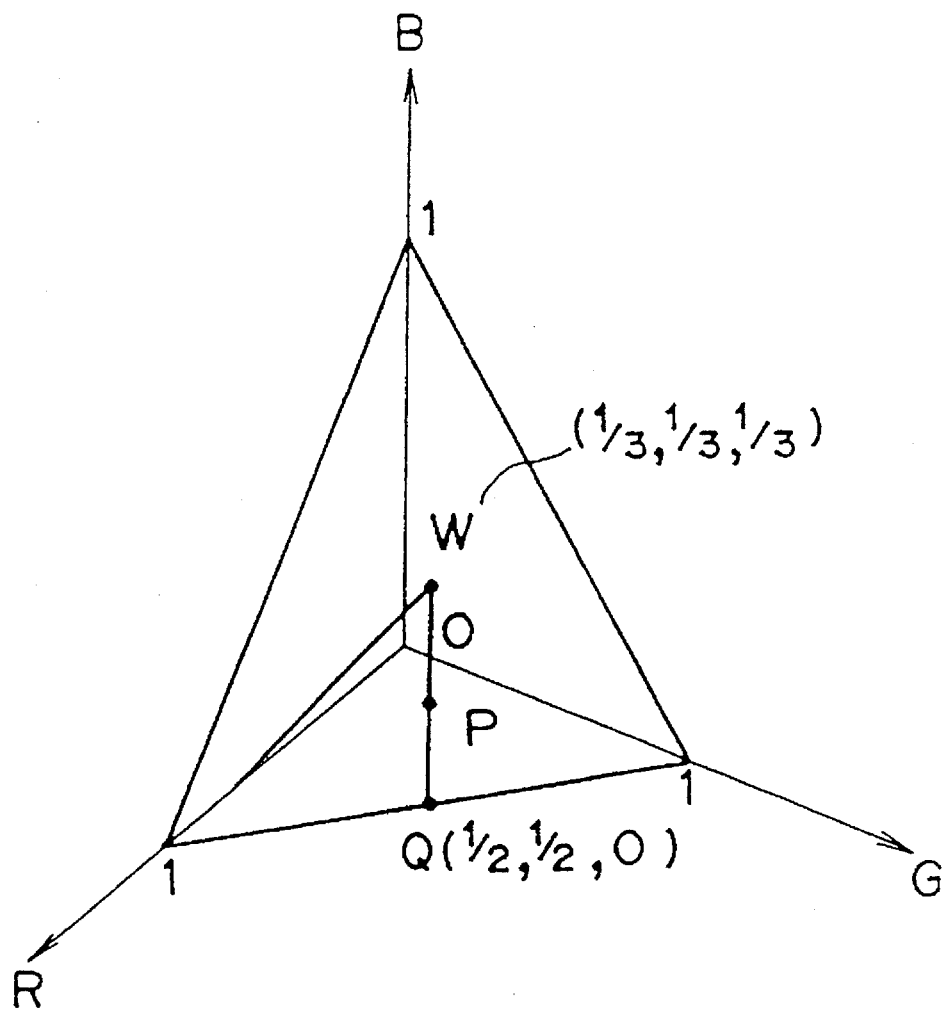
FIG. 3 is a line diagram illustrating a color coordinate.

FIG. 2 illustrates a face extraction routine of the face extraction circuit 36. In step 100, noise removal, i.e., smoothing, of the three-color photometric data is effected. In subsequent step 102, the three color photometric data R, G, B is converted to H (hue value), L (lightness value), and S (saturation value) by the following formulae (1) through (3):

$$L = (R+G+B)/3 \qquad (1)$$

$$S = 1 - \min(r', g', b') \qquad (2)$$

$$H = H'/2P_i \qquad (3)$$

wherein R, G, B are three color photometric data which are standardized such that the respective minimum values thereof are zero and the respective maximum values thereof are 1 as illustrated by the three-dimensional color coordinate of FIG. 3; min( ) is the minimum value of the number in the parentheses; and r', g', b' are respectively defined as r'=R/L, g'=G/L, b'=B/L. Further, H' is determined by following formula (4) in which $P_i$ is P in FIG. 3 (i is one of R, G, B).

$$H' = \frac{P_i}{2} - \tan^{-1}\frac{x}{1-x^2} \qquad (4)$$

-continued wherein $$x = \frac{2(R-L)^2 + (G-L)^2 + (B-L)^2}{6L(R-L)^2 + (G-L)^2 + (B-L)^2} \quad (5)$$

Figure 4A:
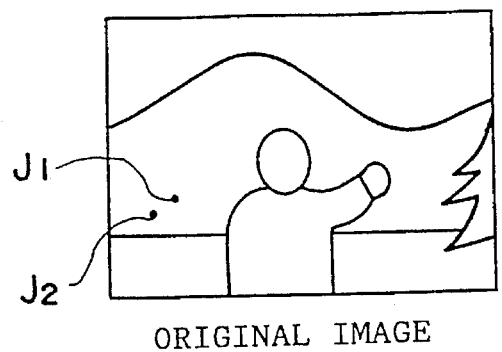
FIG. 4A is a line diagram illustrating an original image.
Figure 4B:
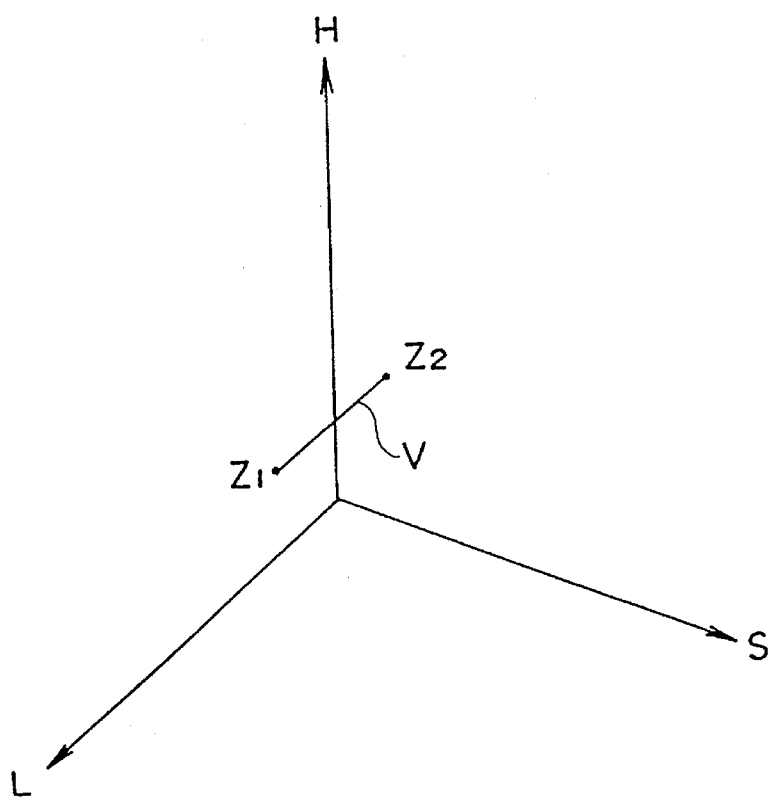
FIG. 4B is a line diagram illustrating a color space formed by axes of lightness values, hue values and saturation values.

In step 104, as illustrated in FIG. 4B, integration processing (details to be described later) is effected for each pixel on the original image by a repeated region expansion method based on a distance V determined at a color space (hereinafter, "HLS color space") on a coordinate system formed by a hue axis, a saturation axis and a lightness axis, which intersect orthogonally. In subsequent step 106, regions contacting the outer edge of the original image are removed from the respective regions which were subject to integration processing. In step 108, regions in which it is likely that a human face will be located, which are characteristic images, are extracted from regions other than those which were removed, i.e., from regions in a vicinity of the center of the original image. In step 110, a face region is assumed from the regions which were extracted as regions in which it is likely that a human face is located. Photometric data for the three colors R, G, B are output for the region assumed to be a face. In step 112, a determination is made as to whether printing of the entire image has been completed. When a determination is made that printing has been completed, the routine ends.

Figure 5A:
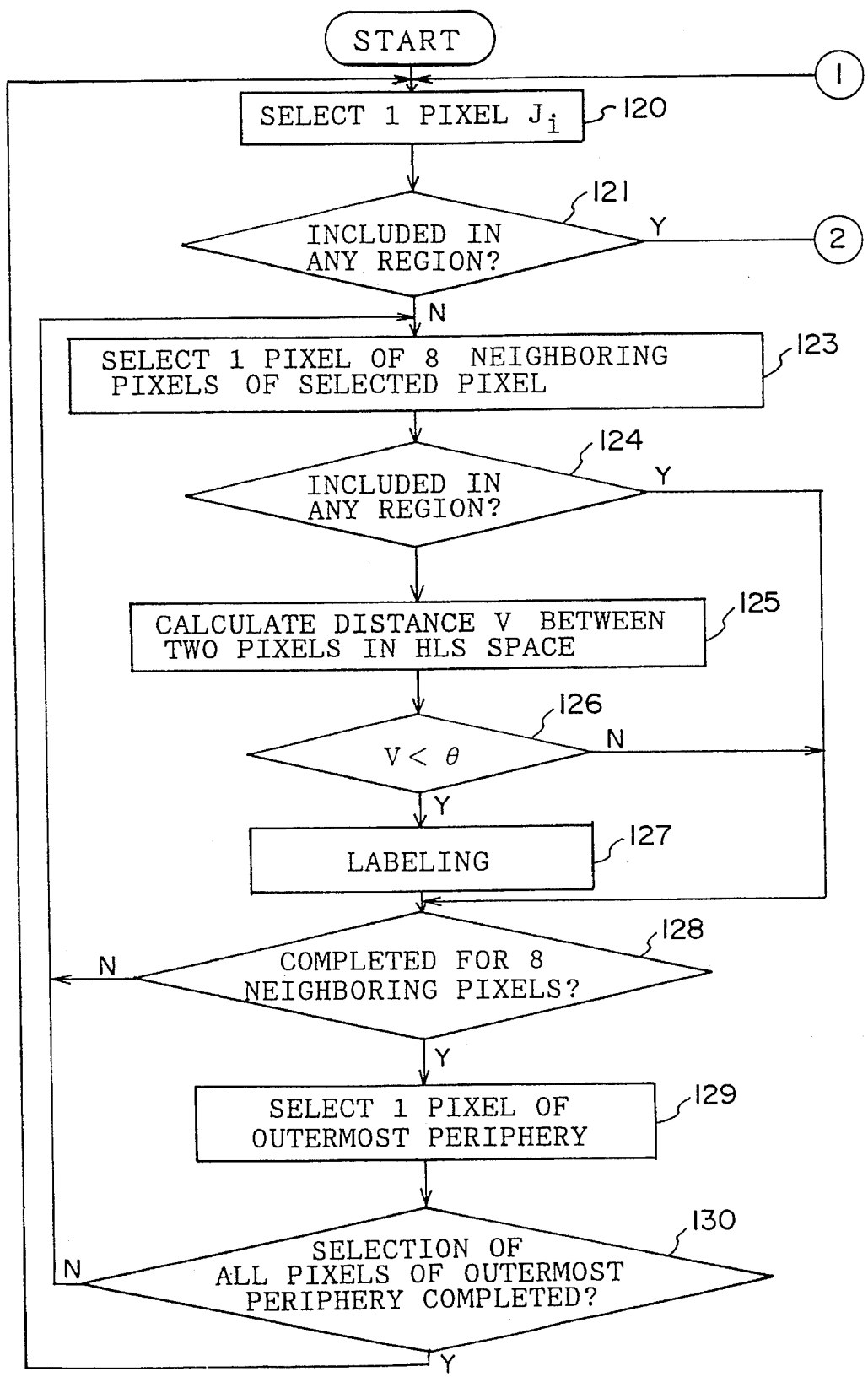
FIGS. 5A and 5B are flow diagrams illustrating details of step 104 in FIG. 2.
Figure 5B:
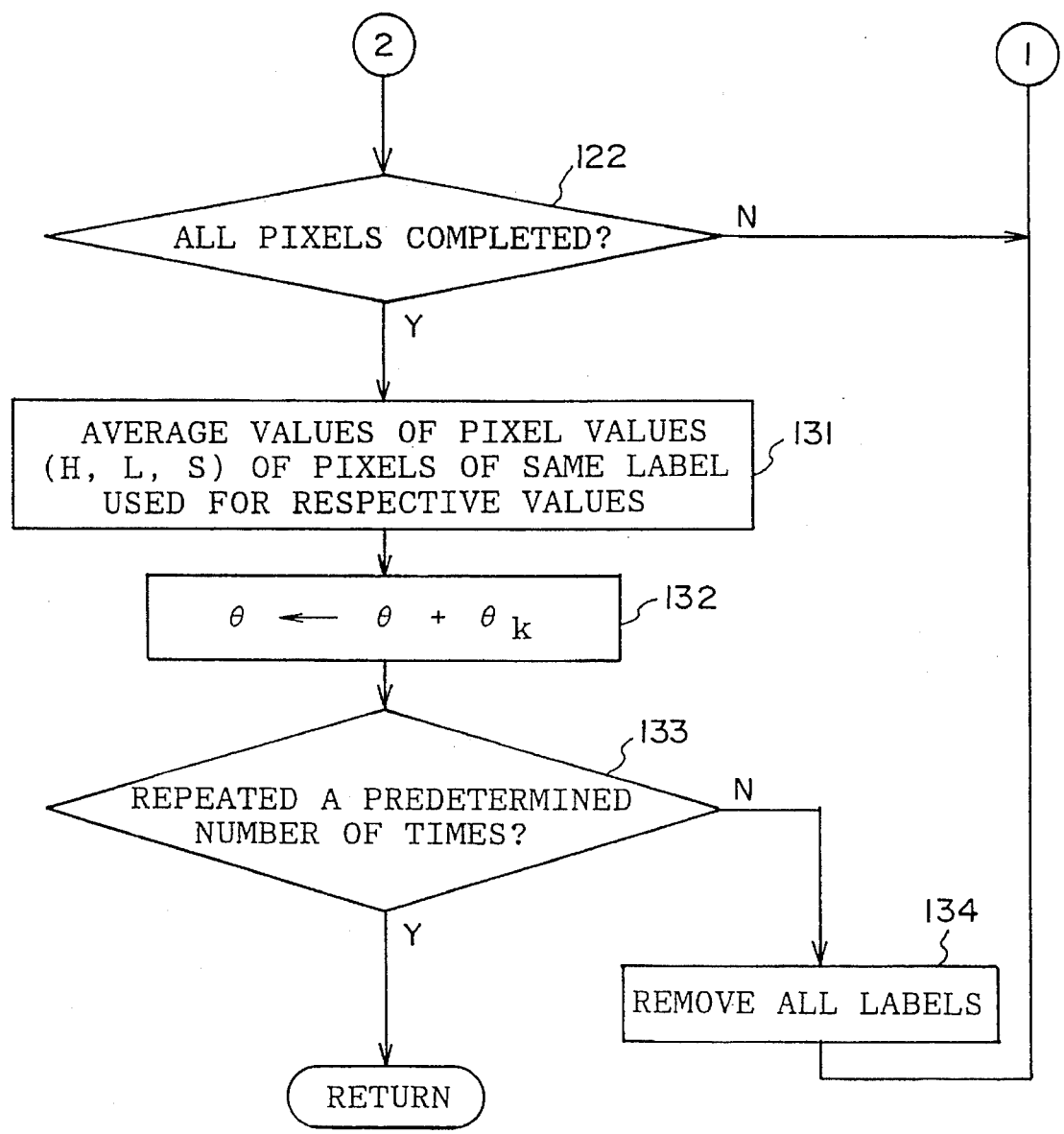

Next, steps 104 through 110 will be described in detail. FIG. 5 illustrates step 104 in detail. In step 120, any one pixel $J_i$ (i= 1 to n, n being the entire number of pixels) from the original image is selected by raster scan or the like. For example, the pixel $J_1$ illustrated in FIG. 4A is selected. In step 121, a determination is made as to whether the selected pixel is included in a region to which a label, which will be described later, has already been applied. If the answer to the determination is "Yes", in step 122, a determination is made as to whether selection has been completed for all of the pixels of the original image. The above processes are repeated until selection of all of the pixels has been completed.

When the selected pixel $J_i$ is not included in a region to which a label is applied, the process proceeds to step 123 where one of the neighboring pixels of the selected pixel $J_i$ (i.e., one of the eight adjacent pixels) is selected. For example, pixel $J_2$ illustrated in FIG. 4A is selected. A determination is made in step 124 as to whether the selected pixel is included in any of regions to which a label has been applied. When the answer to the determination is "No", the process proceeds to step 125 where the distance V at the HLS color space is determined for the two selected pixels $J_1$, $J_2$ based on following formula (5). Namely, as illustrated in FIG. 4B, the distance V between a point $Z_1$ corresponding to pixel $J_1$ and a point $Z_2$ corresponding to pixel $J_2$ in the HLS color space is determined. The distance V represents the similarity of the lightness, saturation and hue of the two pixels $J_1$, $J_2$. Namely, as the distance V becomes greater, the similarity between the pixels decreases, and as the distance V becomes shorter, the similarity between the pixels increases.

$$V = \sqrt{(dH^2 + dL^2 + dS^2)} \quad (5)$$

wherein dH: the difference between the hue values of the pixels $J_1$, $J_2$ dL: the difference between the lightness values of the pixels $J_1$, $J_2$ dS: the difference between the saturation values of the pixels $J_1$, $J_2$ In step 126, a determination is made as to whether the two pixels are similar by determining whether the determined distance V is less than a predetermined value θ. When the pixels are similar, in step 127, processing is effected to apply the same label to the two pixels (labeling), and the process proceeds to step 128. On the other hand, if the pixels are not similar, the process proceeds to step 128 without labeling being effected.

In step 128, a determination is made as to whether the above-described processes have been completed for all of the eight adjacent pixels. If any of the eight adjacent pixels have not been processed, the process returns to step 123. When processing has been completed for all of the eight adjacent pixels, the process proceeds to step 129 where one pixel of the outermost periphery of a region (of the original image) having the same label is selected. Next, in step 130, a determination is made as to whether selection of all of the pixels of the outermost periphery has been completed. If the answer to the determination is "No", the process returns to step 123, and the above-described processes are repeated. When the answer to the determination in step 130 is "Yes", the process returns to step 120 where the next pixel $J_i$ is selected, and the above processes are repeated. In this way, the same label is successively applied to similar pixels at respective peripheries of pixels of the outermost periphery of a region having the same label. Integration processing of pixels of the original image having similar hue, lightness and saturation can thereby be effected.

Figure 12A:
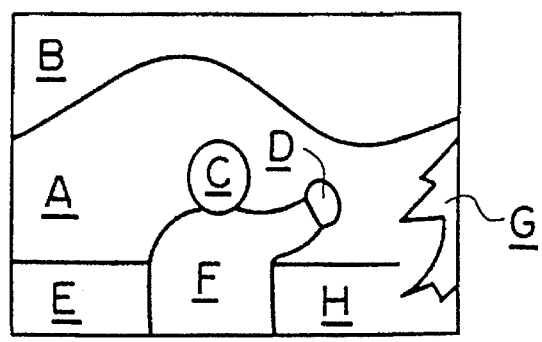
FIGS. 12A through 12C are image views for explaining regions of an original image, which are likely to be face regions, until a time of extraction.

When integration processing for the original image has been completed, the answer to the determination in step 122 is "Yes", and the process proceeds to step 131. In step 131, respective averages values of the hue values, saturation values and lightness values of a group of pixels having the same label is determined, and the determined average values are used for the respective hue values, saturation values, and lightness values of each pixel. In step 132, the predetermined value θ used in step 126 is increased by an increment value θk, and the process proceeds to step 133. The increment value θk corresponds to the rate of region expansion of the above-described integration processing. A predetermined value (e.g., 1) is used as the increment value θk. In step 133, by determining the number of times that steps 131 and 132 were executed (e.g., four times), the number of times that integration processing was repeated is determined. If the number of times integration processing was repeated is less than a predetermined number, all of the applied labels are removed in step 134, and thereafter, the process returns to step 120. When the number of times integration processing was repeated reaches a predetermined number of times, the main routine is completed. In the example of FIG. 4A, after the main routine is completed, the labels A through G are applied as illustrated in FIG. 12A.

In this way, in step 104, adjacent pixels of an original image are subject to integration processing in accordance with similarities in hue, lightness, and saturation. Therefore, the original image can be classified into regions which better suit a viewer's vision.

Figure 6:
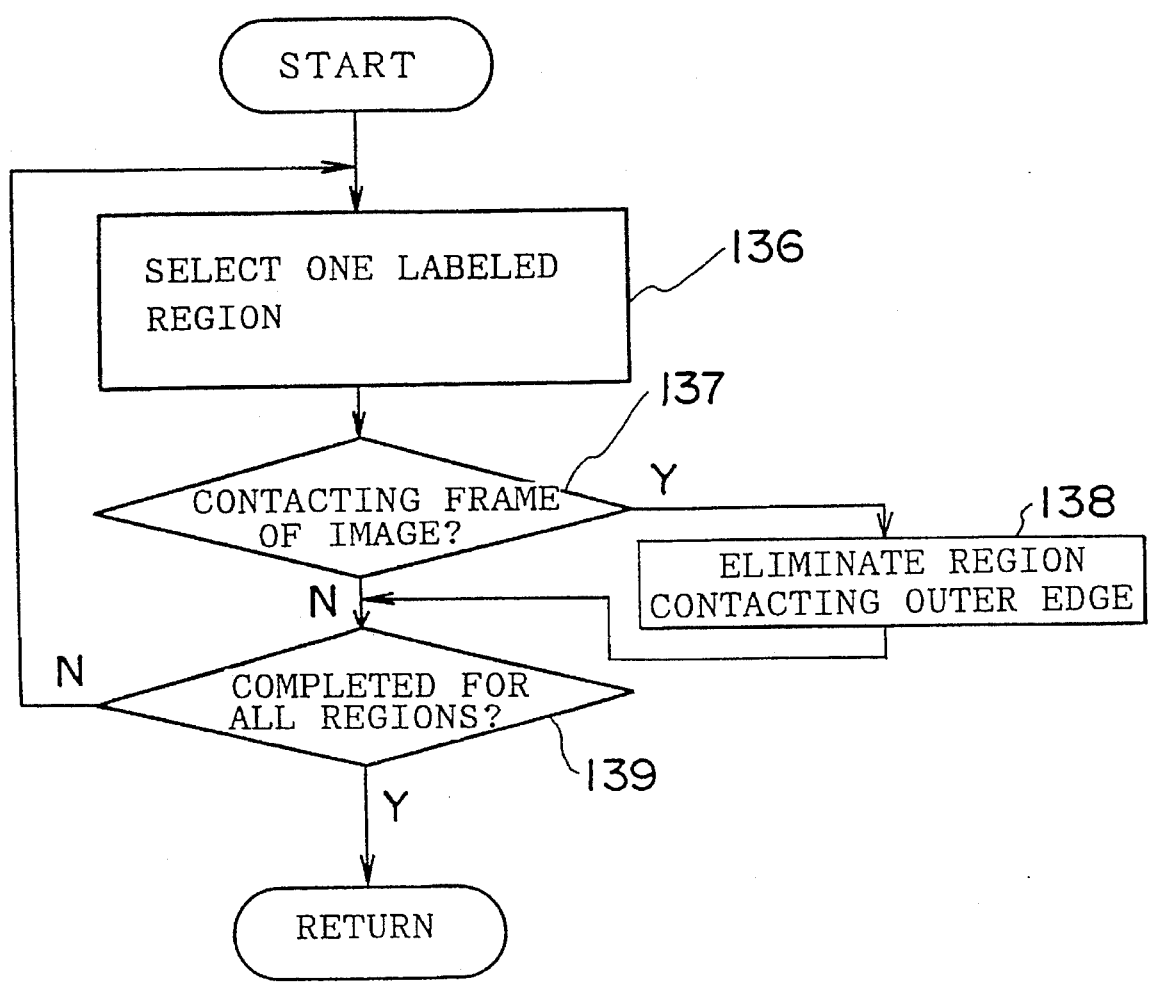
FIG. 6 is a flow diagram illustrating details of step 106 in FIG. 2.

FIG. 6 illustrates the details of step 106 of FIG. 2. In step 136, one of the regions, of the original image, of a pixel group labeled as described above is selected.

The focusing position of a photographing device such as a camera exists at the approximate center. Therefore, in an original image, a characteristic image such as a human face or the like, usually exists at a central area of the original image. Accordingly, regions of the image contacting the outer edge (frame of the image) of the original image are usually not characteristic images and are portions of the background or the like. As a result, in subsequent step 137, a determination is made as to whether a region, which was selected by the determination as to whether the pixel included in the selected region is positioned at the outermost periphery of the original image, is contacting the outer edge of the original image. When a determination is made that the selected region is contacting the outer edge of the original image, the selected region is eliminated in step 138, and thereafter, the process proceeds to step 139. In step 138, by removing the labels of the selected regions only is equivalent to the elimination of the regions. However, if a determination is made that the selected region is not contacting the outer edge, the process merely proceeds to step 139.

Figure 12B:
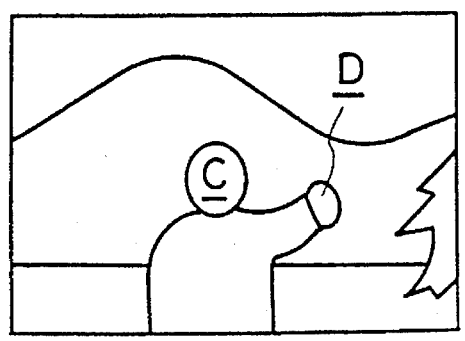

In step 139, a determination is made as to whether the above-described processes have been completed for all of the regions of a labeled pixel group in the original image. When there are regions which have not yet been processed, the routine returns to step 136, and the above steps are repeated. When all of the regions have been processed in the above-described manner, the main routine is completed. Accordingly, after completion of the main routine, there is a high probability that a characteristic image, e.g., a region including a face, remains. In the example of FIG. 4A, areas labeled C and D remain, as illustrated in FIG. 12B.

Figure 7:
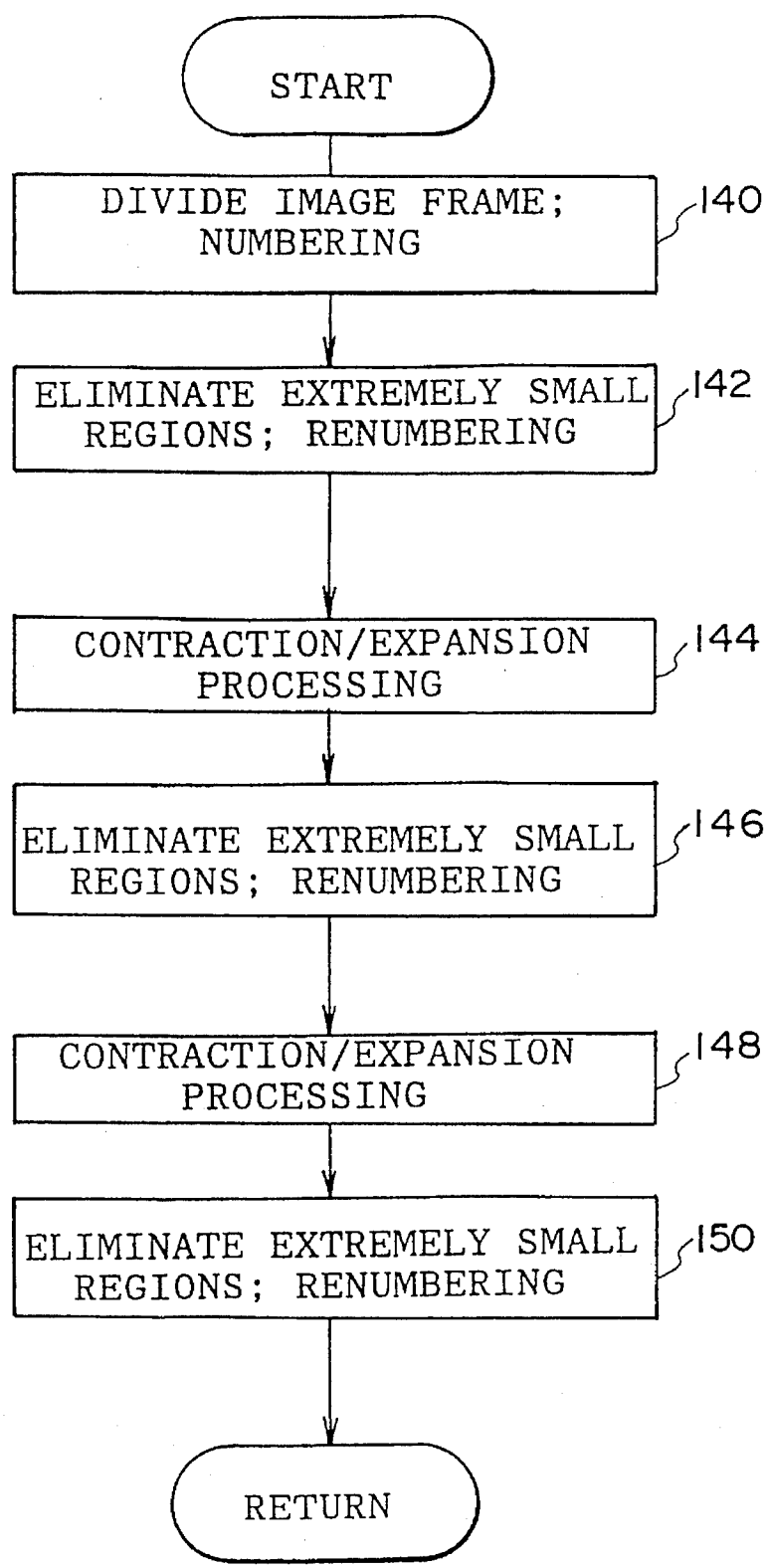
FIG. 7 is a flow diagram illustrating details of step 108 in FIG. 2.

FIG. 7 illustrates the details of step 108 in FIG. 2. In step 140, the original image is divided into the regions of the original image which were labeled as described previously. Further, each of the divided regions is numbered. In this case, the regions contacting the outer edge of the original image are eliminated.

Figure 12C:
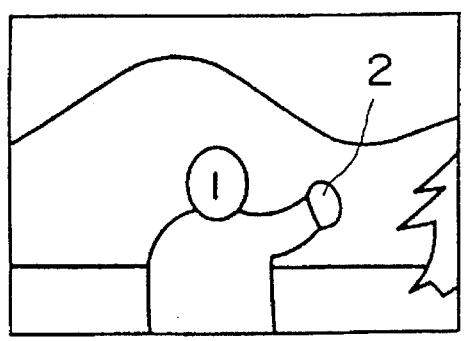

In step 142, extremely small regions are eliminated by determining the surface areas of the divided regions, and the regions are then renumbered. In step 144, a contracting process, in which all of the boundary pixels of a region are eliminated, and an expanding process, in which, in a manner opposite to the contracting process, the boundary pixels are increased in the direction of the background pixels, are effected. Small regions, which have merged with large regions, are thereby separated from the large regions. In step 146, extremely small regions are eliminated and the regions are renumbered in the same way as in step 142. In step 148, the contracting and expanding processes are carried out as described above in order to separate regions which are weakly linked together. In step 150, removal of the extremely small regions and renumbering are effected in the same way as described above. In the example of FIG. 4A, after the main routine is completed, the regions are numbered 1, 2 as illustrated in FIG. 12C.

Figure 8:
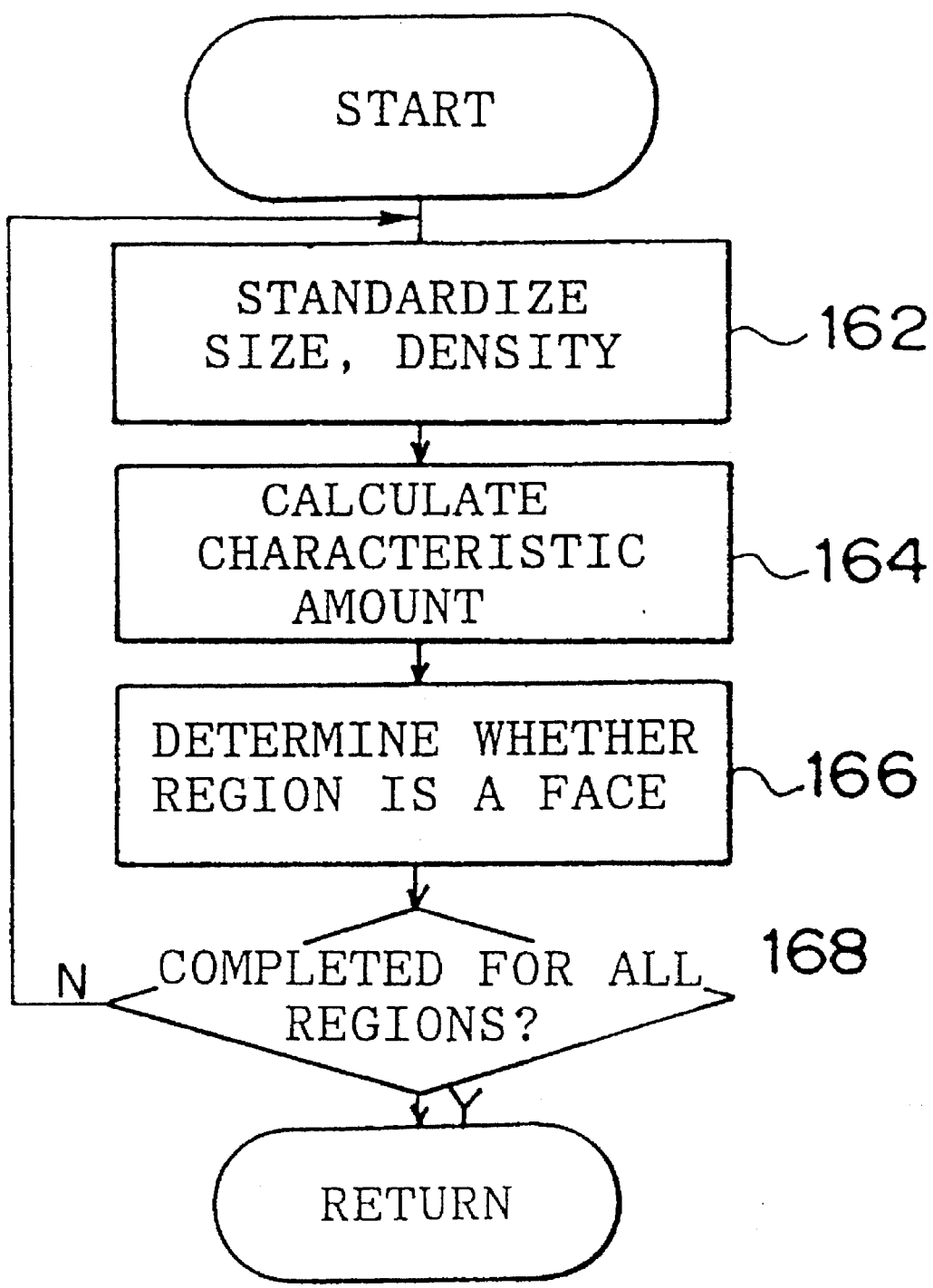
FIG. 8 is a flow diagram illustrating details of step 110 in FIG. 2.

FIG. 8 illustrates the details of step 110. In step 162, one region among the regions extracted in step 108, i.e., in the routine of FIG. 7, is selected as a region of notice. Enlargement/reduction processing of the region of notice is effected and the size of the region of notice is standardized so that the horizontal fillet diameter and the vertical fillet diameter of the region of notice become predetermined values. Further, the density value or the luminance value is standardized in accordance with following formula (6).

$$d_r = \frac{d_s}{d_{max} - d_{min}} \cdot (d - d_{min}) \quad (6)$$

wherein $d_{max}$: maximum density value (or luminance value) within region $d_{min}$: minimum density value (or luminance value) within region $d_s$: full scale density value (or luminance value) of image sensor $d$: density value (or luminance value) before standardization $d_r$: density value (or luminance value) after standardization In step 164, a correlation coefficient r of the region of notice with respect to a plurality of types (10 types in the present embodiment) of standard face images determined in advance (a face image as viewed from the front, face images as viewed from the sides (left and right), a downward-turned face image, and upward-turned face image and the like) is calculated in accordance with following formula (7). It suffices that the standard face image is only data of an outline of a face. Alternatively, the standard face image may be data in which data regarding the structure of the inner portion of the face (eyes, nose, mouth, and the like) is added to the data of the outline of the face.

$$r = \frac{\sigma_{fg}}{\sigma_f \sigma_g} \quad (7)$$

wherein $$\sigma_{fg} = \frac{1}{T^2} \sum_x \sum_y f(x, y) g(x, y) - \quad (8)$$

$$\frac{1}{T^2} \sum_x \sum_y f(x, y) \cdot \frac{1}{T^2} \sum_x \sum_y g(x, y)$$

$$\sigma_f = \left\{ \frac{1}{T^2} \sum_x \sum_y (f(x, y))^2 - \frac{1}{T^2} \sum_x \sum_y (f(x, y))^2 \right\}^{1/2}$$

$$\sigma_g = \left\{ \frac{1}{T^2} \sum_x \sum_y (g(x, y))^2 - \frac{1}{T^2} \sum_x \sum_y (g(x, y))^2 \right\}^{1/2}$$

and T is the length of the horizontal and vertical fillet diameter of the image (here, the lengths of the fillet diameters are the same); f(x,y) is the region of notice; and g(x,y) represents the standard face image.

In step 166, a determination is made as to whether the region of notice is a human face by linear discrimination analysis in which the characteristic amount is a variable. R, G, B photometric data of a region determined to be a face is output to the appropriate exposure amount calculating circuit 40. In step 168, a determination is made as to whether determinations of whether a region is a face have been completed for all of the extracted regions. If the determinations have not been completed, steps 162 through 168 are repeated.

In the above explanation, the correlation coefficient is used as the characteristic amount which is used for determining whether a region is a human face. However, an invariant, an autocorrelation function or a geometrical invariant derived from a central moment which is normalized around a center of gravity may be used.

If a (p+q) order central moment $\mu_{pq}$ of the image f(x,y) around the center of gravity is expressed as:

$$\mu_{pq} = \sum_x \sum_y (x - \bar{x})^p (y - \bar{y})^q f(x, y) \quad (9)$$

wherein $$\bar{x} = \frac{m_{10}}{m_{00}} \quad (10)$$

$$\bar{y} = \frac{m_{01}}{m_{00}}$$

-continued $$m_{pq} = \sum_x \sum_y x^p y^q f(x, y)$$
$$(p, q = 0, 1, 2 \ldots)$$

then the normalized central moment around the center of gravity is as follows.

$$\eta_{pq} = \frac{\mu_{pq}}{(\mu_{00})^y} \quad (11)$$

wherein $y = (p+q+2)/2$ $p+q=2, 3 \ldots$

From the above, the following seven invariants $\phi_i$ (i= 1, 2 . . . 7) can be derived from second order and third order normalized central moments around the center of gravity.

$$\begin{aligned}
\phi_1 &= \eta_{20} + \eta_{02} \quad (12) \\
\phi_2 &= (\eta_{20} - \eta_{02})^2 + 4\eta_{11}^2 \\
\phi_3 &= (\eta_{30} - 3\eta_{12})^2 + (3\eta_{21} - \eta_{03})^2 \\
\phi_4 &= (\eta_{30} + \eta_{12})^2 + (\eta_{21} + \eta_{03})^2 \\
\phi_5 &= (\eta_{30} - 3\eta_{12})(\eta_{30} + \eta_{12}) [(\eta_{30} + \eta_{12})^2 - \\
&\quad 3(\eta_{21} + \eta_{03})^2] + (3\eta_{21} - \eta_{03})(\eta_{21} + \eta_{03}) \times \\
&\quad [3(\eta_{30} + \eta_{12})^2 - (\eta_{21} + \eta_{03})^2] \\
\phi_6 &= (\eta_{20} - \eta_{02}) [(\eta_{30} + \eta_{12})^2 - (\eta_{21} + \eta_{03})^2] + \\
&\quad 4\eta_{11}(\eta_{30} + \eta_{12})(\eta_{21} + \eta_{03}) \\
\phi_7 &= (3\eta_{21} - \eta_{03})(\eta_{30} + \eta_{12}) [(\eta_{30} + \eta_{12})^2 - \\
&\quad 3(\eta_{21} + \eta_{03})^2] + (3\eta_{12} - \eta_{30})(\eta_{21} + \eta_{03}) \times \\
&\quad [3(\eta_{30} + \eta_{12})^2 - (\eta_{21} + \eta_{03})^2]
\end{aligned}$$

Further, an autocorrelation function $R_f$ is expressed as follows.

$$R_f = \sum_x \sum_y f(x, y) f(x+s, y+t) \quad (13)$$

A geometrical invariate characteristic amount is expressed by the following formula.

$$X_f = \sum_x \sum_y f(x, y) f(x+s, y+t) f(x+u, g+u) \quad (14)$$

In this way, background regions contacting the outer edge of the original image are eliminated, and a determination is made by using the outline of the region and the inner structure. Therefore, face data can be accurately extracted even from an image which includes faces, the ground, trees and the like having similar hues.

Further, a determination as to whether a region is in a predetermined skin color range may be added to the above-described determination as to whether the region is a human face. Namely, one of the regions from among the regions extracted in the routine in FIG. 7 is selected as a region of notice. Respective average values of the hue values, lightness values and saturation values are determined for the region of notice. A determination is made as to whether the respective determined average values of the hue values, lightness values and saturation values are included in a predetermined range representing a skin color. If the values are in the predetermined range representing a skin color, it is assumed that the region of notice is a human face. In this case, it suffices to determine whether the pixels are included in the predetermined range without determining the respective average values of the hue values, lightness values and saturation values of the region of notice.

The appropriate exposure calculating circuit 40 calculates the appropriate exposure amount $E_i$ in accordance with the following formula by using the R, G, B photometric data of the face region extracted at the face extraction circuit 36 as described above and by using the frame average density $D_i$ (wherein i is any one of R, G, B) of one frame which was calculated at the average density calculating circuit 38. The appropriate exposure calculating circuit 40 outputs the appropriate exposure amount $E_i$ to the driver 42, and the driver 42 calculates an exposure control value from the appropriate exposure amount $E_i$ so as to control the light-adjusting filter 16.

$$\log E_i = LM_i \cdot CS_i \cdot (DN_i - D_i) + PB_i + LB_i + MB_i + NB_i + K_1 + K_2 \quad (15)$$

wherein the respective notations represent the following.

LM: Magnification slope coefficient. Set in advance in accordance with the enlargement ratio determined from the type of the negative and the print size.

CS: Color slope coefficient prepared for each type of negative, including underexposed and overexposed negatives.

It is determined that the average density of a frame to be printed is either under or over a standard negative density value, and the color slope coefficient for either underexposure or for overexposure is selected.

DN: Standard negative density value.

D: Average density value of print frame.

PB: Correction balance value for standard color paper. Determined in accordance with the type of color paper.

LB: Correction lens balance value for standard printing lens. Determined in accordance with type of printing lens.

MB: Correction value (master balance value) for fluctuations in printing light source and variations in the paper developing capability.

NB: Negative balance (color balance) value determined by characteristic of negative film.

$K_2$: Color correction amount.

$K_1$: Density correction amount expressed by the following formula.

$$K_a \left( \frac{D_R + D_G + D_B}{3} - \frac{FD_R + FD_G + FD_B}{3} \right) + K_b \quad (16)$$

Here, $K_a$ and $K_b$ are constants, and FD is the face region average density.

Further, a correction value determined by a film testing device may be used as the density correction amount $K_1$ in above formula (15), and the color correction amount $K_2$ may be expressed by using the face region average density as follows.

$$(K_2)_i = K_c \left\{ \left( FD_i - \frac{FD_R + FD_G + FD_B}{3} \right) - \left( DN_i - \frac{DN_R + DN_B + DN_G}{3} \right) \right\} \quad (17)$$

wherein $K_c$ is a constant.

Moreover, correction amounts determined by a film testing device may be used as the density correction amount $K_1$ and the color correction amount $K_2$ of formula (15), and the average density $D_i$ of the print frame in formula (15) may be substituted by the average density $FD_i$ of the face region so as to determine the exposure amount.

In the present embodiment, the determination as to whether an extracted region is a human face is made after the background regions contacting the outer edge of the original image have been removed. Therefore, data regarding a face can be reliably extracted from even an image including faces, the ground, trees and the like having similar hues.

In step 108, for the respective regions which are likely to be face regions and which were extracted in step 108, a determination as to whether a region of notice is a face can be made from the configuration and color information of the region of notice and from the configuration and color information of adjacent regions, which are regions positioned at the periphery of the region of notice. Namely, a determination may be made as to whether a region, which is at a periphery of the region of notice and which has the same hue value and the same saturation value as the region of notice or has a hue value and a saturation value which are similar to those of the region of notice and whose size (e.g., horizontal fillet diameter and vertical fillet diameter can be used) is in the range of 25 to 100% of the size of the region of notice, has been extracted. Due to this determination, it can be determined whether a region corresponding to a human arm or leg has been extracted.

Further, an extracted region may be formed as a line drawing, and a determination may be made as to whether the region of notice is a face based on the configuration of the adjacent regions, which are located at the periphery of the region of notice, and based on the configuration of the region of notice. In this case, line information of the region extracted as described above is extracted, so that each region is transformed into a line drawing. By comparing a standard line drawing, which is stored in advance and which represents a human shoulder, with the line drawing of the frame, a determination is made as to whether a line drawing representing a shoulder exists. When a line drawing representing a shoulder exists, if there exists another line drawing above the former (shoulder) line drawing, this other line drawing is taken as a line drawing of notice. A determination is made as to whether there is yet another line drawing representing a head portion (e.g., a hat, hair, a helmet or the like) above the line drawing of notice. If there is a line drawing representing a head portion above the line drawing of notice and there is a line drawing representing a shoulder below the line drawing of notice, there is a high probability that the line drawing of notice is a line drawing of a face. As a result, a determination is made as to whether the outline of the line drawing of notice is similar to the outline of a line drawing of a standard face. If it is determined that the line drawing of notice is a face, R, G, B photometric data of the region corresponding to the line drawing of notice are output. Accordingly, by determining, from the configuration or the like of the region of notice, whether the region of notice is a face, data regarding a face can be extracted even from images which include faces, the ground, trees and the like having similar hues. Further, because the determination as to whether a region is a face is not made by using the detailed structure of a face, the determination can be made with a short calculating time even if the resolution of the image is low.

Figure 9:
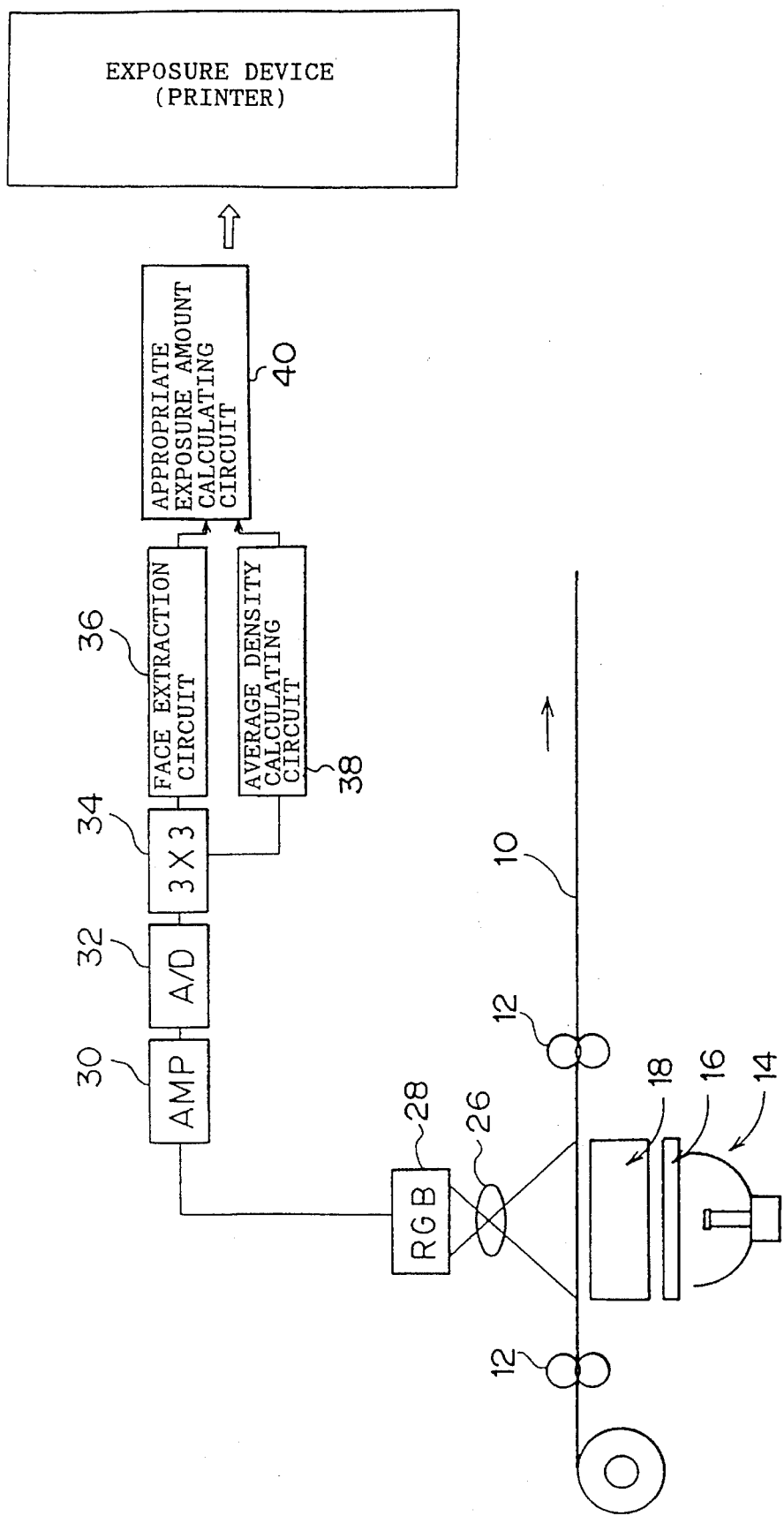
FIG. 9 is a schematic view of an exposure amount calculating device to which the present invention is applied.

FIG. 9 illustrates a variation in which the present invention is applied to an exposure amount determining device which is provided separately from a printer or a printer processor. Portions of FIG. 9 which correspond to portions of FIG. 1 are denoted by the same reference numerals, and description thereof is omitted. Further, it is not always necessary to use the average density calculating circuit 38, and instead, an integrated transmission density detecting circuit which detects the LATD of the entire image may be used.

Figure 10:
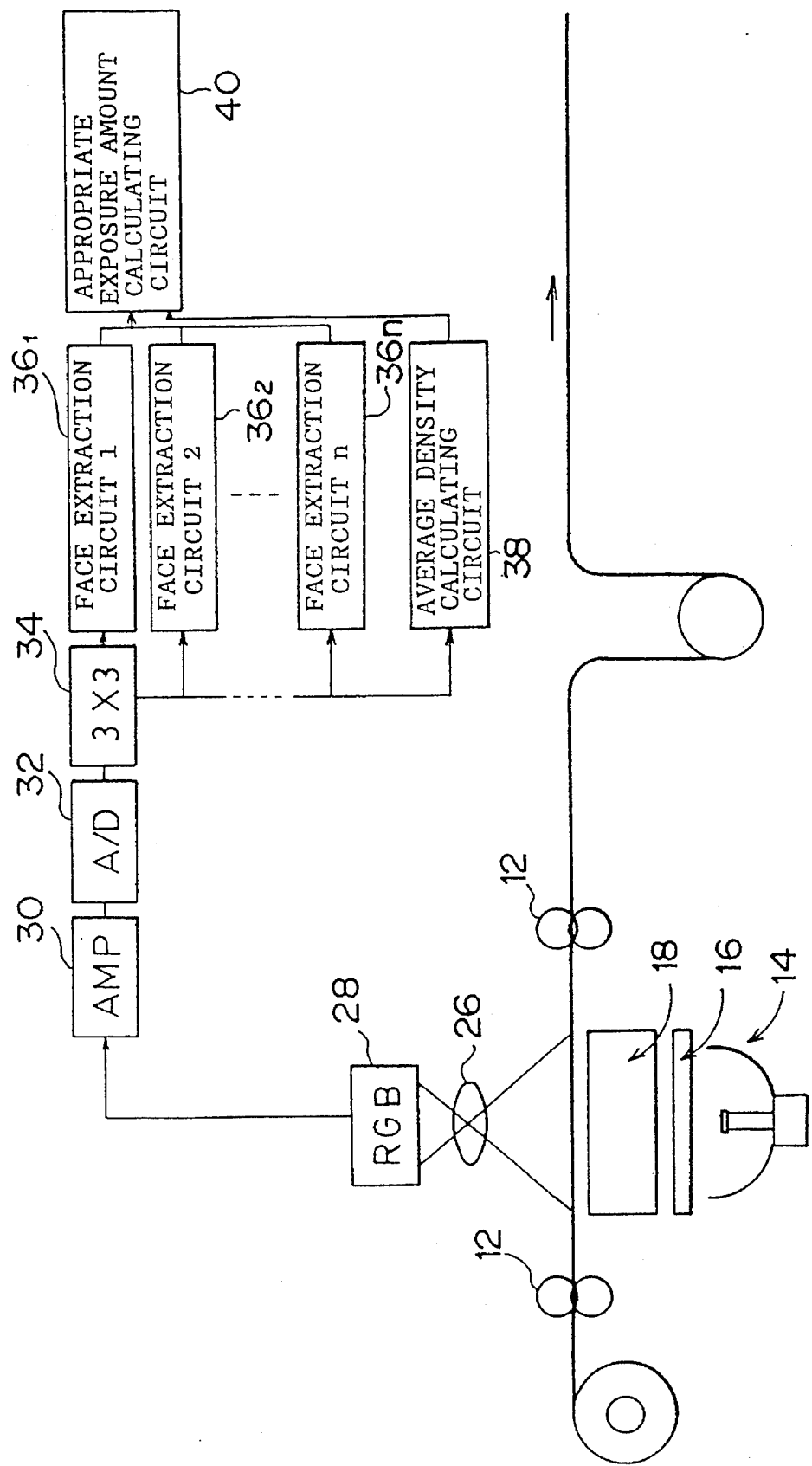
FIG. 10 is a schematic view of an exposure amount calculating device which effects parallel processing by a plurality of face extraction circuits.
Figure 11:
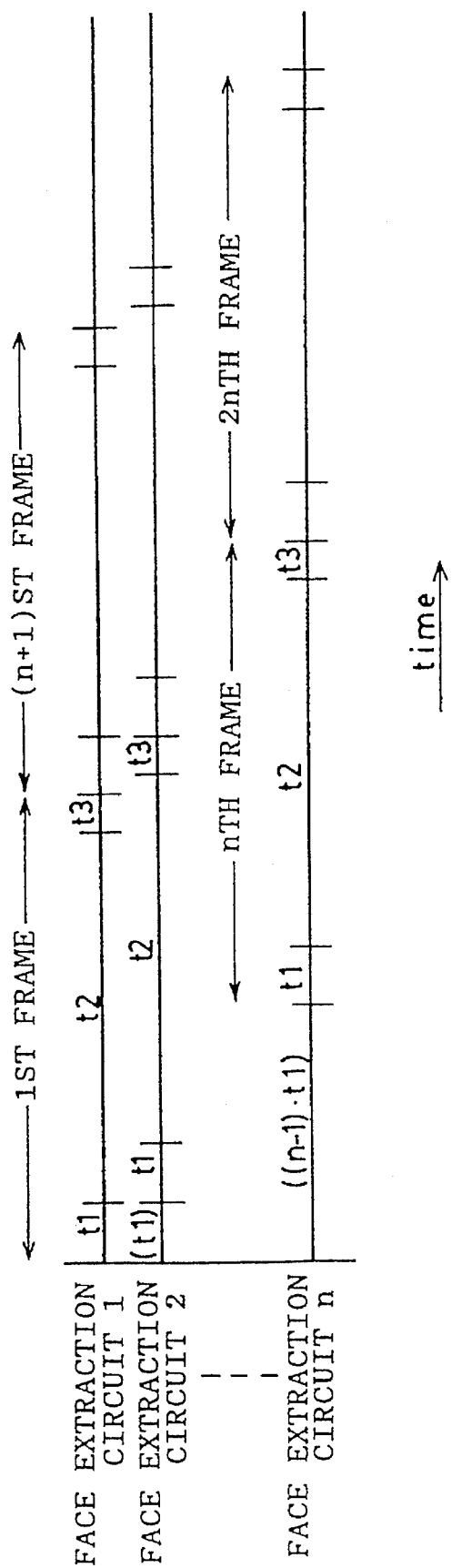
FIG. 11 is a line diagram illustrating a time chart of parallel processing.

In FIG. 10, the face extracting circuit of FIG. 9 is formed of a plurality of face extracting circuits $36_1, 36_2 \ldots 36_n$ so that the exposure amount is calculated by parallel processing. The face extracting circuits $36_1, 36_2 \ldots 36_n$ read the image in accordance with the time chart in FIG. 11, calculate the exposure amount, and output the results. In FIG. 11, $t_1$ is the time for reading the image of one frame, $t_2$ is the time for calculating the exposure amount of one frame, $t_3$ is the time for transmitting the results of calculation of the exposure amount of one frame, and $t_2 > > t_1, t_3$. The face extraction circuit $36_1$ reads the image of one frame in $t_1$, calculates the amount of exposure in $t_2$, and transmits the results of calculation in $t_3$. At the same time that the reading of the image of one frame by the face extraction circuit $36_1$ is completed, the film is advanced one frame, and the reading of the image of one frame by the face extraction circuit $36_2$ begins. The calculation of the exposure amount by the face extraction circuit $36_1$ and the reading of the image by the face extraction circuit $36_2$ are effected in parallel. Thereafter, parallel processing is effected in a similar manner by the face extraction circuits $36_3, 36_4 \ldots 36_n$.

The time $T_p$ necessary for the parallel processing of m×n frames is $$T_p = m(t_1+t_2+t_3)+ (n-1)t_1.$$

On the other hand, the processing time $T_s$ when parallel processing is not effected is $$T_s= m \cdot n(t_1+t_2+t_3).$$

Accordingly, it is possible to effect processing $T_s/T_p$ times faster, $T_s/T_p$ being as follows.

$$T_s/T_p = \frac{m \cdot n (t_1 + t_2 + t_3)}{m (t_1 + t_2 + t_3) + (n-1) t_1} \tag{18}$$

This parallel processing device can also be used with the printer in FIG. 1.

Other than the determination of the amount of exposure for a photographic printing device, the present invention can also be used to determine the amount of exposure of a digital color printer, to determine copy conditions of a copier, to determine the amount of exposure of a camera, to determine the display conditions of a CRT image, and to determine the amount of light when a hard copy is prepared from magnetic image data.

In the above-described embodiment, the similarity between respective pixels is determined by using the distance at the color space formed by the hue values, saturation values and lightness values. However, the present embodiment is not limited to use of the color space; the similarity of the hue values and the similarities of the hue values and the saturation values may be determined.

As an example of determining the similarity between the hue values, a histogram for the hue values of the color original image may be determined. The determined histogram is divided per mountain by using the valleys or the foot portions of the mountains of the histogram as borderlines so that hue value ranges of each mountain are determined. Next, by determining to which hue value range the hue value of each pixel belongs, it is determined to which divided mountain each pixel belongs. A plurality of pixels are divided into groups (clusters) corresponding to the divided mountains. Next, the color original image is divided into regions corresponding to the divided groups. In this way, the color original image is divided into regions including pixels having hue values within the hue value ranges determined by dividing the histogram. Accordingly, pixels whose hue values fall within a predetermined range are included within one region on the color original image. If at least one region representing a characteristic of the image is selected from the regions other than the regions contacting the outer edge of the color original image as described above, a region which includes characteristic image data of a human face or the like, can be selected.

Further, in order to determine the similarities of the hue values and the saturation values, a two-dimensional histogram for hue values and saturation values is determined. The two-dimensional histogram is divided per mountain, and the color original image is divided in the same way as described above. At least one region other than the regions contacting the outer edge of the color original image is selected from among the divided regions, and the data thereof is extracted. The hue of a human face may be similar to the flesh-colored portions of the ground, trees, and the like. However, in most cases, the saturations are different, and the ground, trees and the like usually contact the outer edge of the original image. Therefore, if data is extracted from color regions other than those regions having the same or similar hue values and saturation values and contacting the outer edge of the color original image, data of a characteristic image such as a human face can be extracted.

A second embodiment of the present invention will be described in detail hereinafter with reference to the drawings. Parts and steps which are the same as those of the first embodiment are denoted by the same reference numerals, and description thereof is omitted. In the present embodiment, the present invention is applied to an automatic printer.

The 3×3 matrix 34 is connected to the appropriate exposure amount calculating circuit 40 via a smoothing circuit 35, which effects noise removal, a color conversion circuit 37 (details of which will be described later), and the face extraction circuit 36, which is formed from a microcomputer. Further, the 3×3 matrix 34 is connected to the appropriate exposure amount calculating circuit 40 via the average density calculating circuit 38 which calculates the average density of an entire single frame. Further, the appropriate exposure amount calculating circuit 40 is connected to the color correction filter 16 via the driver 42 which drives the color correction filter 16. The smoothing circuit 35 may be formed by a microcomputer, or may have a circuit structure.

(Structure of Color Conversion Circuit)

Figure 14:
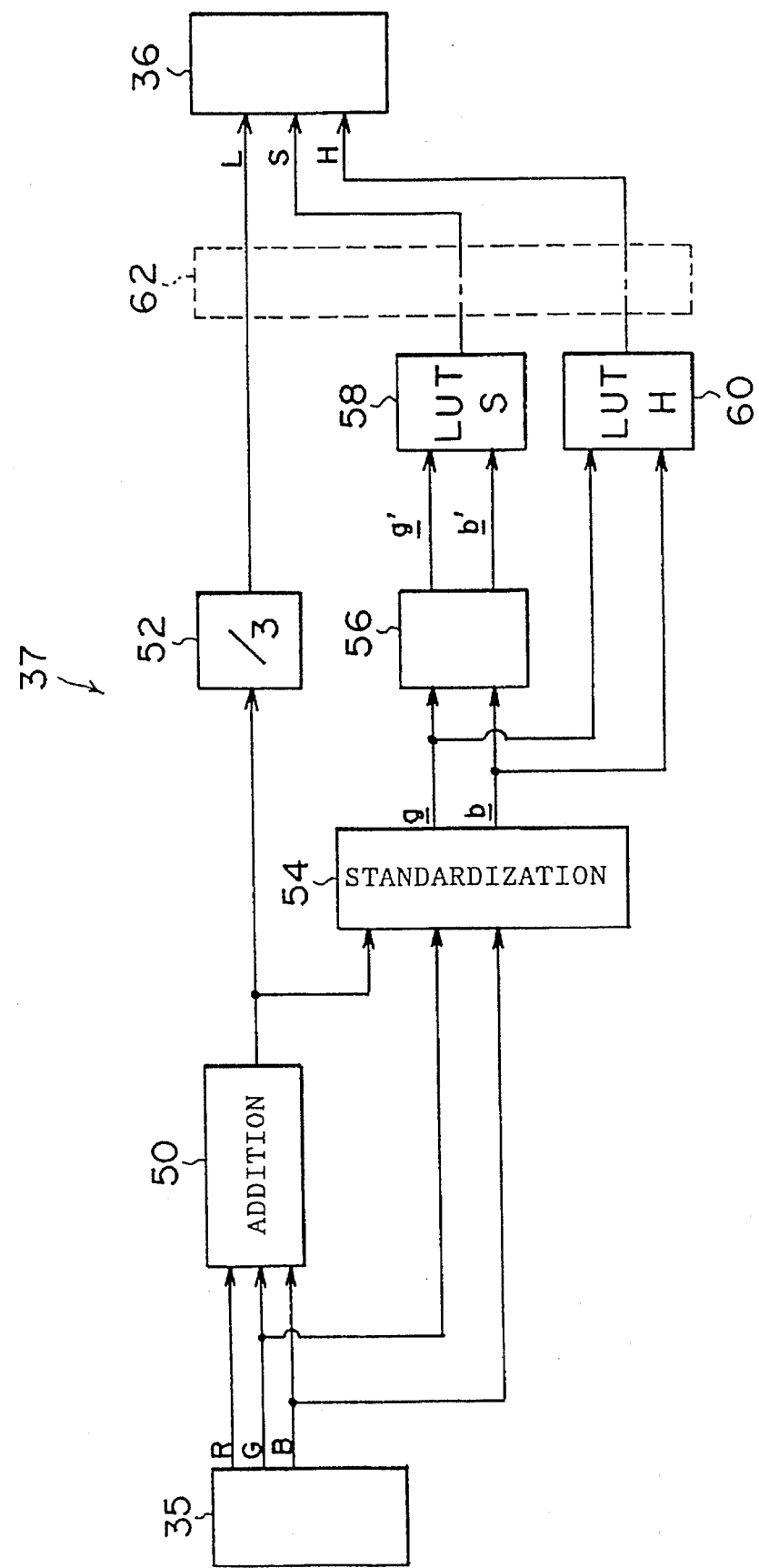
FIG. 14 is a schematic block view illustrating a structure of a color conversion circuit.

The structure of the color conversion circuit 37 is illustrated by the block diagram in FIG. 14. The color conversion circuit 37 is a circuit which converts the R, G, B three color photometric data, which are inputted after noise removal is effected at the smoothing circuit 35, into H (hue value), L (lightness value) and S (saturation value). In the present embodiment, 8-bit data is used for the photometric data for the three colors R, G, B. The receiving and sending of data at areas which are not designated in particular is carried out by using 8-bits.

The smoothing circuit 35 is connected to an addition circuit 50. The photometric data for the three colors R, G, B are respectively input to the addition circuit 50. The addition circuit 50 is connected to the face extraction circuit 36 via a divider 52 which divides by a predetermined value (3 in the present embodiment) and a synchronizing circuit 62. The addition circuit 50 is also connected to a standardization circuit 54. In the present embodiment, the data outputted from the divider 52 is used as the lightness value L. Accordingly, the lightness value L is determined by the following formula (19).

$$L = (R+G+B)/3 \qquad (19)$$

wherein R, G, B are the respective three color photometric data.

The smoothing circuit 35 is connected to the standardization circuit 54 such that the photometric data for two colors G, B from the smoothing circuit 35 are input separately. The standardization circuit 54 is formed by a divider, and outputs standardized data g, b which is standardized by dividing the respective inputted G, B photometric data for the two colors G, B by the photometric data for the three colors R, G, B. Namely, the standardization circuit 54 has the same circuit structure as calculation based on the following formula (20). The standardized data g, b are used as indices in a saturation look-up table (hereinafter referred to as "$LUT_S$") 58 and a hue look-up table (hereinafter referred to as "$LUT_H$") 60.

$$g = k \cdot G/(R+G+B)$$

$$b = k \cdot B/(R+G+B) \qquad (20)$$

wherein k is a constant (e.g., 1000) for making the calculated value an integer.

The standardization circuit 54 is connected to the $LUT_S$ 58 via a subtracter 56 and to the $LUT_H$ 60. The output number of bits (effective bit number) of the standardized data g, b outputted from the standardization circuit 54 is increased by the necessary resolution of the $LUT_H$ 60 and is determined. In the present embodiment, the results of calculation using the inputted 8-bit data are outputted as 10-bit data. Accordingly, the respective 10-bit standardized data g, b are inputted to the subtracter 56 and the $LUT_H$ 60.

The subtracter 56 outputs the standardized data g, b as 8-bit standardized data g', b' by the bit shift or the like of a shift register. Further, the subtracter 56 can be formed in the same way as the operation of the bit shift by connecting the data line of the high order 8 bits. The 10-bit standardized data g, b are output as the 8-bit standardized data g', b' because the sensitivity of the saturation is low with respect to that of an ordinary hue, and even if the resolution deteriorates slightly, there is no substantial effect on the sensitivity of the saturation.

The $LUT_S$ 58 is formed of a storing element such as a SRAM or the like, and a plurality of saturation values S are stored therein. Each of the plurality of saturation values S is stored in an area of an address designated by an index. The 8-bit standardized data g', b' described above are used as the indices. Accordingly, saturation values S corresponding to the respective values of the standardized data g', b' can be selected. For example, of the 16-bit address of the $LUT_S$ 58, the standardized data g' is input as the high order 8 bits and the standardized data b' is input as the low order 8 bits. In this way, when the respective standardized data g', b' are calculated, the saturation value stored in the area of the address corresponding to the calculated values is output. Accordingly, indices of 8+8=16 bits, i.e, $2^{16}$ relations, are stored in the $LUT_S$ 58. If the saturation value data stored in the $LUT_S$ 58 is 8 bits, the storage capacity of the $LUT_S$ 58 is $2^{16}$ bytes, i.e., approximately 65 kilobytes.

The $LUT_H$ 60 is formed of a storing element such as a SRAM or the like, and a plurality of hue values H are stored therein. Each of the plurality of hue values H is stored in an area of an address designated by an index. The 10-bit standardized data g, b described above are used as the indices. Accordingly, hue values H corresponding to the respective values of the standardized data g, b can be selected. For example, of the 20 bit address of the $LUT_H$ 58, the standardized data g is input as the high order 10 bits and the standardized data b is input as the low order 10 bits. In this way, when the respective standardized data g, b are calculated, the hue value stored in the area of the address corresponding to the calculated values is output. Accordingly, indices of 10+10=20 bits, i.e, $2^{20}$ relations, are stored in the $LUT_H$ 60. If the hue value data stored in the $LUT_H$ 60 is 8 bits, the storage capacity of the $LUT_H$ 60 is $2^{20}$ bytes, i.e., approximately 1.05 megabytes.

The $LUT_S$ 58 and the $LUT_H$ 60 are connected to the face extraction circuit 36 via the synchronizing circuit 62. The synchronizing circuit 62 includes an unillustrated latch circuit which temporarily stores data. The respective data outputted from the divider 52, the $LUT_S$ 58 and the $LUT_H$ 60 are synchronized and outputted per pixel by the synchronizing circuit 62.

Because the respective standardized data g, b are calculated by dividing by the sum of the R, G, B three color photometric data, the R color photometric data component is included therein, and a single standardized data r corresponds to the standardized data g, b. Accordingly, even if only two standardized data g, b are used, processing can be effected in the same way as a case in which three standardized data r, g, b are used. As a result, the relation between the standardized data g', b' and the saturation value S and the relation between the standardized data g, b and the hue value H result from storing as indices the standardized data g, b or the standardized data g', b', which are values resulting from calculation based on the three color photometric data. Further, the present embodiment is not limited to the combination of the standardized data g, b; any combination of two of the standardized data r, g, b may be used.

A method in accordance with the following formula (21) may be used to calculate the hue value H and the saturation value S.

$$S = 1 - \min(r, g, b)$$
$$H = H'/2Pi \qquad (21)$$

wherein R, G, B are three color photometric data which are standardized such that the respective minimum values thereof are zero and the respective maximum values thereof are 1 as illustrated by the three-dimensional color coordinate of FIG. 3, and min( ) is the minimum value of the number in the parentheses. Further, H' is determined by following formula (22) in which $P_i$ is P in FIG. 3 (i is one of R, G, B).

$$H' = \frac{Pi}{2} - \tan^{-1} \frac{x}{1-x^2} \qquad (22)$$

wherein
$$x = \frac{2(R-L)^2 + (G-L)^2 + (B-L)^2}{6L(R-L)^2 + (G-L)^2 + (B-L)^2} \qquad (23)$$

Next, operation of the present embodiment will be described. Light irradiated from the light source 14 is transmitted through the color correction filter 16, the diffusion box 18, and the color negative film 10, is distributed by the distribution prism 20, and is received by the CCD image sensor 28 via the projecting optical system 26. At this time, the black shutter 23 is closed. The CCD image sensor 28 receives the light, divides an entire single image into a plurality of pixels, divides each pixel into the three colors of R, G, B, photometrically measures the R, G, B, and outputs a photometric data signal. After the photometric data signal is amplified at the amplifier 30, the signal is converted into a digital signal at the A/D converter 32. Correction of the sensitivity of the image sensor is effected at the 3×3 matrix circuit 34, and the photometric data signal is input to the smoothing circuit 35 and the average density calculating circuit 38. The average density for one entire image is calculated at the average density calculating circuit 38. At the smoothing circuit 35, noise removal of the three color photometric data is effected. The three color photometric data which have been subject to noise removal are converted into hue values H, saturation values S and lightness values L at the color conversion circuit 37 for facilitating calculation at the time of estimating a face area as will be described later. The converted hue values H, saturation values S and lightness values L are respectively input to the face extraction circuit 36. At the face extraction circuit 36, a region of a face of a human in an image is estimated, and the photometric data of the three colors R, G, B of the region assumed to be the face is output. The exposure amount calculating circuit 40 uses the three color photometric data, which was outputted from the face extraction circuit 36, and the average density, which was determined at the average density calculating circuit 38, to calculate the amount of exposure. The exposure amount calculating circuit 40 controls the color correction filter 16 via the driver 42 and opens and closes the black shutter 23 so that printing is effected. When the average density calculated at the average density calculating circuit 38 is used, the exposure correction amount with respect to the average density can be determined. If the exposure correction amount is not determined, the average density calculating circuit 38 does not have to be employed, and the amount of exposure may be determined directly from the three color photometric data outputted from the face extraction circuit 36.

As illustrated in FIG. 14, the photometric data for the three colors R, G, B, which have been inputted in the color conversion circuit 37 and subject to noise removal, are respectively input to the addition circuit 50, and the sum thereof is output to the divider 52. At the divider 52, the sum of the photometric data for the three colors R, G, B is divided by the number of the colors which are color divided (in this case, the sum is divided by 3 as there are three colors of R, G, B). Accordingly, the photometric data for the three colors R, G, B are averaged by calculation of the addition circuit 50 and the divider 52, and the average value is output to the synchronizing circuit 62 as the lightness value L.

Further, the sum of the R, G, B three color photometric data calculated by the addition circuit 50 is input to the standardization circuit 54. At the standardization circuit 54, the respective photometric data for two colors G, B is standardized into 10-bit standardized data g, b by the sum of the photometric data for the three colors R, G, B. The 10-bit standardized data g, b are respectively used as designating indices for outputting a hue value H stored in the $LUT_H$ 60. The hue value H corresponding to the standardized data g, b is output to the synchronizing circuit 62. Accordingly, a hue value H corresponding to the respective 10-bit standardized data g, b, i.e., corresponding to the R, G, B three color photometric data designated by an index of 20-bit data, is output from the $LUT_H$ 60.

Because the resolution of the saturation may be lower than that of the hue, the 10-bit standardized data g, b are reduced by the subtracter 56 to the 8-bit standardized data g', b'. The standardized data g', b' are used as indices for outputting a saturation value S stored in the $LUT_S$ 58, and a saturation value S corresponding to the standardized data g', b' is output to the synchronizing circuit 62. Accordingly, a saturation value S corresponding to the respective 8-bit standardized data g', b', i.e., corresponding to the R, G, B three color photometric data designated by an index of 16-bit data, is output from the $LUT_S$ 58.

The lightness value L, the saturation value S and the hue value H are synchronized per pixel at the synchronizing circuit 62 and are output to the face extraction circuit 36.

In this way, the lightness value can be determined by the average, which is a simple calculation, and the hue value and the saturation value can be obtained by the designation of the respective look-up tables, i.e., the $LUT_S$ 58 and the $LUT_H$ 60, by indices. Therefore, the present embodiment does not require the time used by conventional conversions, and the conversion processing time is shortened.

Further, because the lightness value can be determined by simple calculation, a memory or the like having a storage capacity for lightness such as that stored in conventional look-up tables is not used. Look-up tables, i.e., the $LUT_S$ 58 and the $LUT_H$ 60, are used for the hue values and saturation values. However, standardized data for two colors, which was standardized on the basis of the photometric data for the three colors R, G, B, is used for the indices designating the $LUT_S$ 58 and the $LUT_H$ 60. Therefore, the number of indices is reduced as compared with a case in which all of the R, G, B three color photometric data are used, and the $LUT_S$ 58 and the $LUT_H$ 60 require few storage regions for the respective data.

As is commonly known, high resolution is required for hue values. Accordingly, a large storage capacity is required for the $LUT_H$ 60. However, in the present embodiment, the data length, i.e., the number of bits, based on the resolution of the hue value H is set at the standardizing circuit 54. The saturation value S requires less resolution than the hue value H. As a result, the number of bits are reduced by the subtracter to the point where sufficient resolution is obtained. In this way, data can be processed at an optimal number of bits in accordance with the necessary resolution. Therefore, the respective storage capacities of the $LUT_S$ 58 and the $LUT_H$ 60 can be set optimally.

Conventionally, approximately 50 megabytes of storage capacity are needed when look-up tables are used in which 8-bit data for the hue values, saturation values, and lightness values, respectively, are stored. However, in accordance with the present embodiment, approximately 1.1 megabytes of storage capacity are used by the $LUT_S$ 58, which is approximately 65 kilobytes, and the $LUT_H$ 60, which is approximately 1.05 megabytes. Namely, in accordance with the present embodiment, the storage capacity can be reduced to 1/50 of that of conventional systems.

Figure 15:
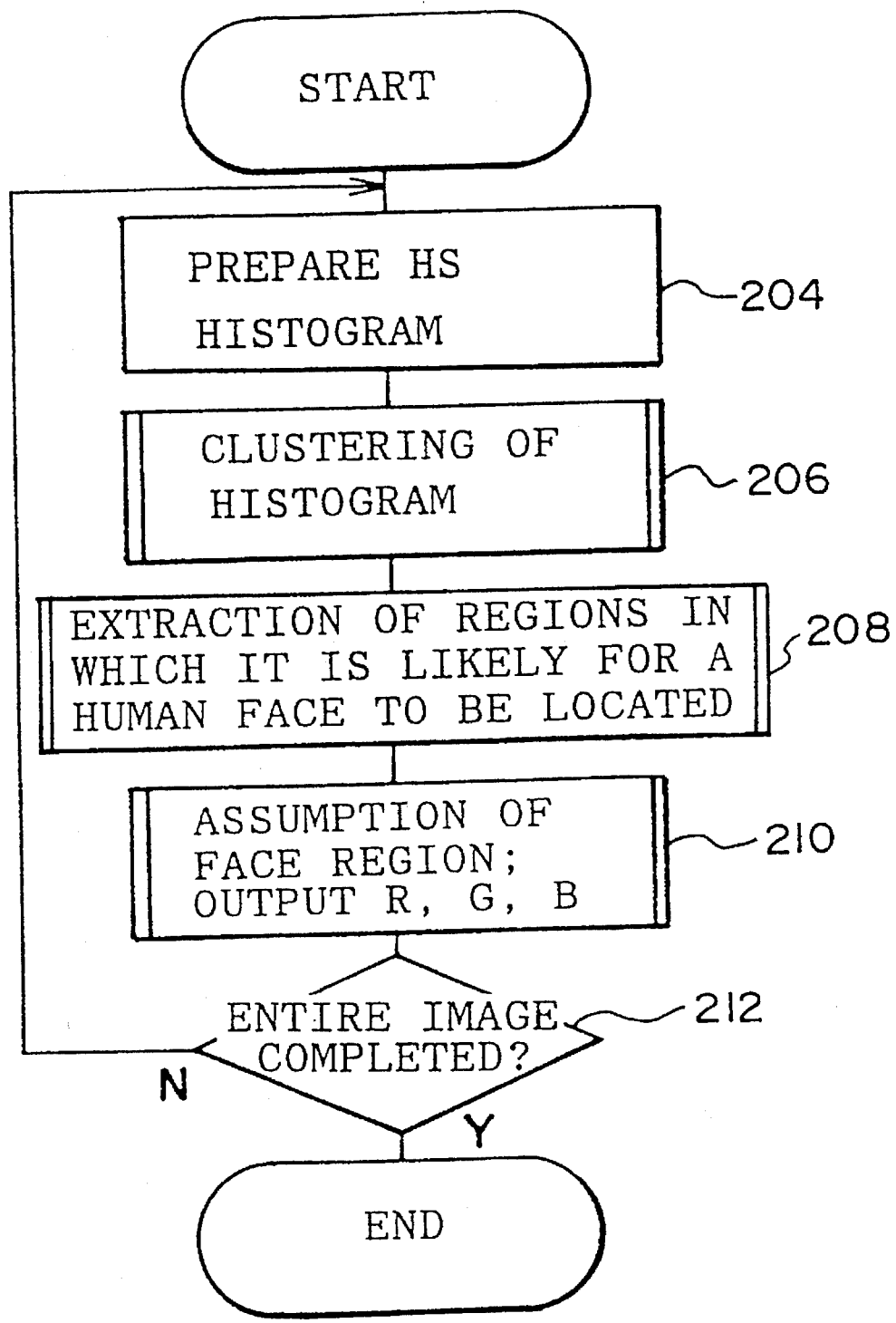
FIG. 15 is a flow diagram illustrating a face extraction routine of a face extraction circuit.

FIG. 15 illustrates a face extraction routine of the face extraction circuit 36. At the face extraction circuit 36, processing is effected on the basis of the hue values, saturation values and lightness values for which noise removal and conversion have been effected.

Figure 16A:
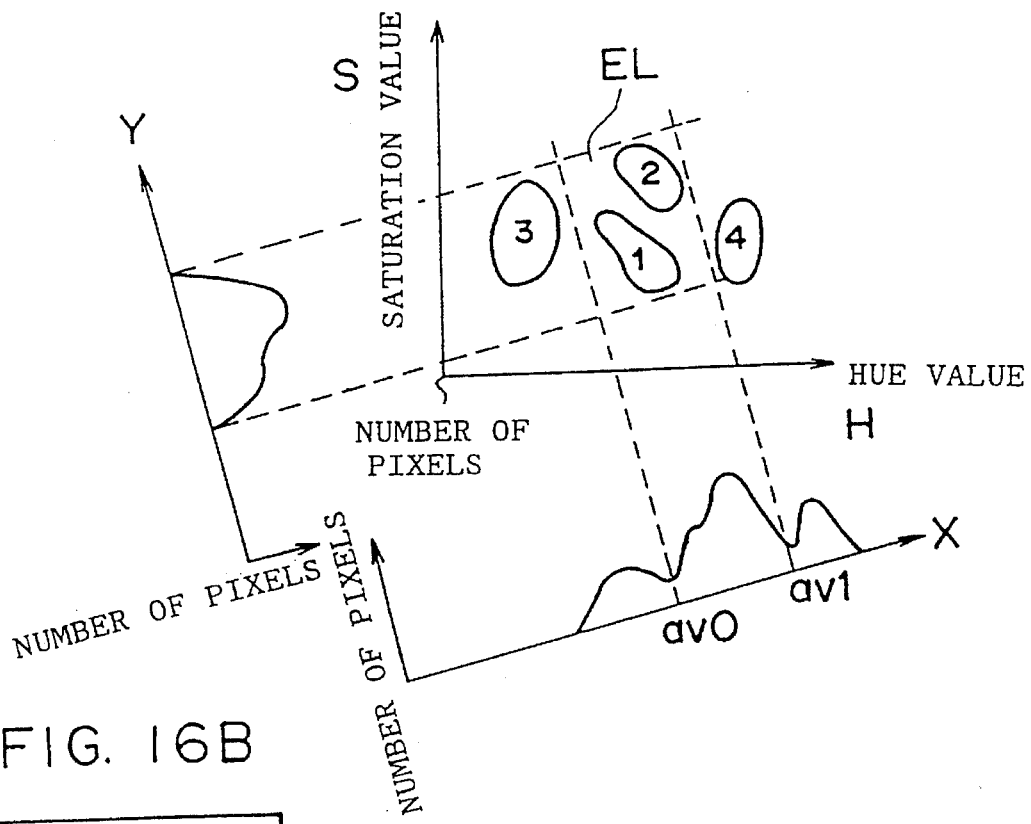
FIG. 16A is a line view illustrating a two-dimensional histogram for hue values and saturation values.

In step 204, as illustrated in FIG. 16A, a two-dimensional histogram for hue values and saturation values is determined by using the coordinate system formed by the hue value axis, the saturation value axis and the number of pixels axis, which are perpendicular to each other. In step 206, as will be described later, the determined two-dimensional histogram is divided per mountain, i.e., clustering of the two-dimensional histogram is effected. In step 208, clustering of a plurality of pixels is effected on the basis of the mountains of the clustered two-dimensional histogram. Based on the clustering of the pixels, the image is divided, and regions in which it is likely that a character's face will be located are extracted from the divided regions. In step 210, a region among the extracted regions in which it is likely for a human face to be located is assumed to be the face region. Photometric data for the three colors R, G, B are output for the region assumed to be the face region. In step 212, a determination is made as to whether printing of the entire image has been completed. When a determination is made that printing has been completed, the routine ends.

Next, steps 206 through 210 will be described in detail. FIG. 17 illustrates step 206 in detail. In step 220, a region which is to be evaluated is cut out from the two-dimensional histogram for hue values and saturation values. In order to simplify the explanation in FIGS. 16A through 16C, a single frame is taken as the region to be evaluated. In step 222, a determination is made as to whether there exists a region to be evaluated. If a region to be evaluated was not cut out in step 220, i.e., when evaluation of all of the regions has been completed, there are no regions to be evaluated, and consequently, the routine is completed. When there exist regions to be evaluated, in step 224, X and Y axes for preparing a histogram to be used for cutting out the mountains are determined. Namely, the region to be evaluated is pivoted around an axis parallel to the number of pixels axis, and positions at which there are the most peaks as seen from the side of the mountains of the histogram are determined, and of the determined positions, a position at which the mountains are the most sharp is determined. This position is used as a reference for determining the X and Y axes. In cases in which it is necessary to shorten the processing time, the axes at which the dispersion of the histogram is a maximum may be used as the X and Y axes, although accuracy will be slightly reduced by use of this method. In the example illustrated in FIG. 16A, when the four mountains numbered 1 through 4 are viewed from the side, the position at which there are the most peaks and at which the mountains are the most sharp is a position at which three mountains can be seen. Therefore, a direction orthogonal to the viewing direction is determined to be the X axis, and a direction orthogonal to the X axis is determined to be the Y axis.

In subsequent step 226, the two-dimensional histogram is projected on the X and Y axes so as to form respective one-dimensional histograms. In the example in FIG. 16A, as seen from a direction orthogonal to the X axis, the mountains numbered 1 and 2 seem to be overlapping. Therefore, three mountains, i.e., the mountain numbered 3, the mountains numbered 1 and 2, and the mountain numbered 4 are expressed in the one-dimensional histogram for the X axis. Because the mountains 1 through 4 overlap when viewed from a direction orthogonal to the Y axis, one mountain is expressed in the one-dimensional histogram for the Y axis. In step 228, the histogram is converted into a performance function H(a) by following formula (24), and cutting out of the mountains from the histogram is effected for the X axis based on this performance function.

$$H(a) = \Sigma \frac{2f(a) - f(a+x) - f(a-x)}{x} \quad (24)$$

wherein f(a) is the number of pixels when the value in the X axis direction (characteristic amount) is a; and x is the displacement from the characteristic amount a.

Namely, an average value T of the performance function H(a) is determined, and a range less than or equal to the average value T of the performance function H(a) (i.e., a range in which a valley or the foot of a mountain exists) is determined. Next, the position in this range at which the histogram is at a minimum is taken as the valley or the foot of the histogram. The histogram is cut out at the determined valley or foot.

The cutting out of the mountain will be explained with reference to FIG. 18. When the performance function H(a) is determined from the histogram represented by the solid line S1, H(a) is expressed by the broken line in the figure. The ranges less than or equal to the average value T with respect to the negative portions of the performance function H(a) are ranges in which the characteristic amount is v0 to v1 and v2 to v3. Positions within these ranges at which the frequency of the histogram is at a minimum are av0=v0 in the range v0 to v1, and av1 in the range v2 to v3. av0 and av1 are determined as a foot portion and a valley, respectively, and the histogram is cut out at these positions.

In step 230, the mountains of the histogram for the Y axis are cut out by the same method used to cut out the mountains of the histogram for the X axis. In subsequent step 232, a region in which the mountains of the one-dimensional histograms for the X axis and the Y axis, which were cut out on the two-dimensional axis as described above, overlap is determined. Cutting out of the mountains from the two-dimensional histogram with respect to hue values and saturation values is effected. Region E1 in FIG. 16A is an example of a mountain cut out as described above.

Figure 16B:
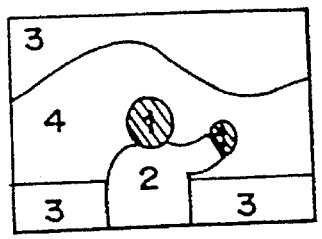
FIG. 16B is a line diagram illustrating a state in which an original image is divided.
Figure 16C:
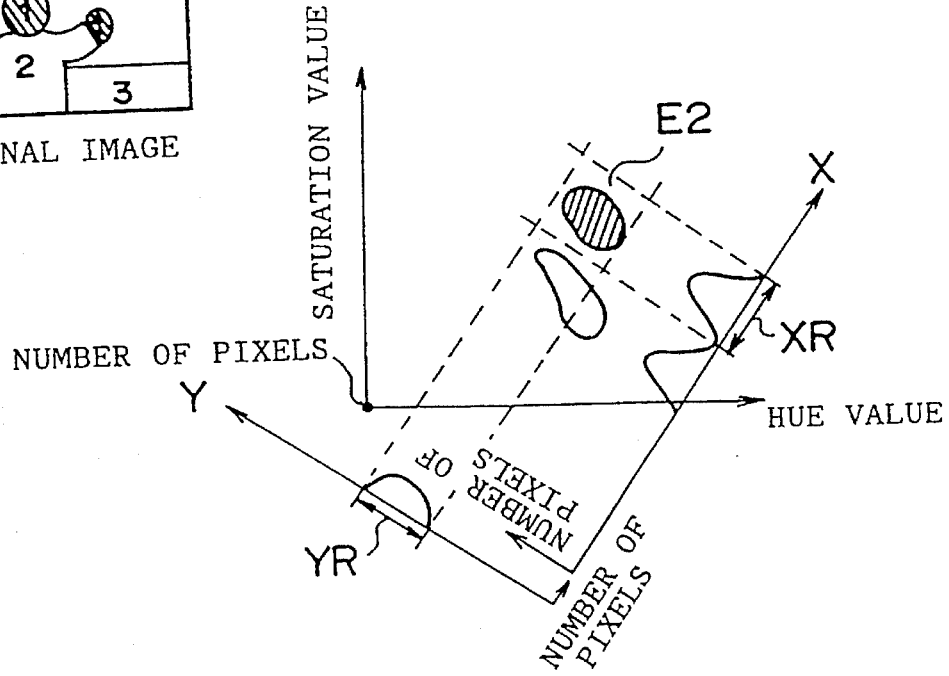
FIG. 16C is a line diagram illustrating a state in which single-peak mountains are cut out from the two-dimensional histogram.

In step 234, a determination is made as to whether the mountain cut out from the two-dimensional histogram has a single peak. If there is no single peak, steps 224 through 234 are repeated until the mountain cut out from the two-dimensional histogram has a single peak. Region E2 in FIG. 16C is an example of a single-peak mountain cut out in the above-described manner.

In step 236, a process for applying a label in order to identify the single-peak mountain which was cut out is effected (labeling). In step 238, the labeled mountain is masked, and the process returns to step 220. The above-described steps are repeated so that all of the regions of the two-dimensional histogram for hue values and saturation values are divided into single-peak mountains.

FIG. 19 illustrates details of step 208 in FIG. 15. In step 240, a range XR (see FIG. 18C) in the X axis direction and a range YR (see FIG. 18C) in the Y axis direction of the single-peak mountains which were divided in the above manner are respectively determined for each single-peak mountain. For each pixel of the original image, a determination is made as to whether the hue value and the saturation value belong in these ranges, and clustering of the pixels is effected. Further, pixels belonging in a range enclosed by the ranges XR, YR are collected, and the original image is divided so that the collected pixels are in a single region on the original image. The divided regions are numbered. FIG. 16B illustrates an example of dividing the original image. The pixels of the respective regions numbered 1 through 4 correspond to the pixels included in the single-peak mountains numbered 1 through 4. The pixels belonging to the same single-peak mountain in FIG. 16A are divided into different regions in FIG. 16B. In FIG. 16A, there are pixels having the hue value range and the saturation value range of the single-peak mountain, and in FIG. 16B, the regions are divided.

In step 242, extremely small regions are eliminated by determining the surface areas of the divided regions, and the regions are then renumbered. In step 244, a contracting process, in which all of the boundary pixels of a region are eliminated, and an expanding process, in which, in a manner opposite to the contracting process, the boundary pixels are increased in the direction of the background pixels, are effected. Small regions, which have merged with large regions, are thereby separated from the large regions. In step 246, extremely small regions are eliminated and the regions are renumbered in the same way as in step 242. In step 248, the contracting and expanding processes are carried out as described above in order to separate regions which are weakly linked together. In step 250, removal of the extremely small regions and renumbering are effected in the same way as described above.

As details of step 210 are the same as those of step 110 of the first embodiment, explanation thereof is omitted.

In the second embodiment, the correlation coefficient is used as the characteristic amount which is used for determining whether a region is a human face. However, as in the first embodiment, an invariant, an autocorrelation function or a geometrical invariant derived from a central moment which is normalized around a center of gravity may be used.

In the present embodiment, judgment is effected by using the outline of the region and the structure of the inner portion thereof. Therefore, face data can even be extracted from an image in which there exist faces, ground, trees and the like having similar hues.

FIG. 20 illustrates a variation in which the present invention is applied to an exposure amount determining device which is provided separately from a printer or a printer processor. Portions of FIG. 20 which correspond to portions of FIG. 13 are denoted by the same reference numerals, and description thereof is omitted. Further, it is not always necessary to use the average density calculating circuit 38, and instead, an integrated transmission density detecting circuit which detects the LATD of the entire image may be used.

Figure 21:
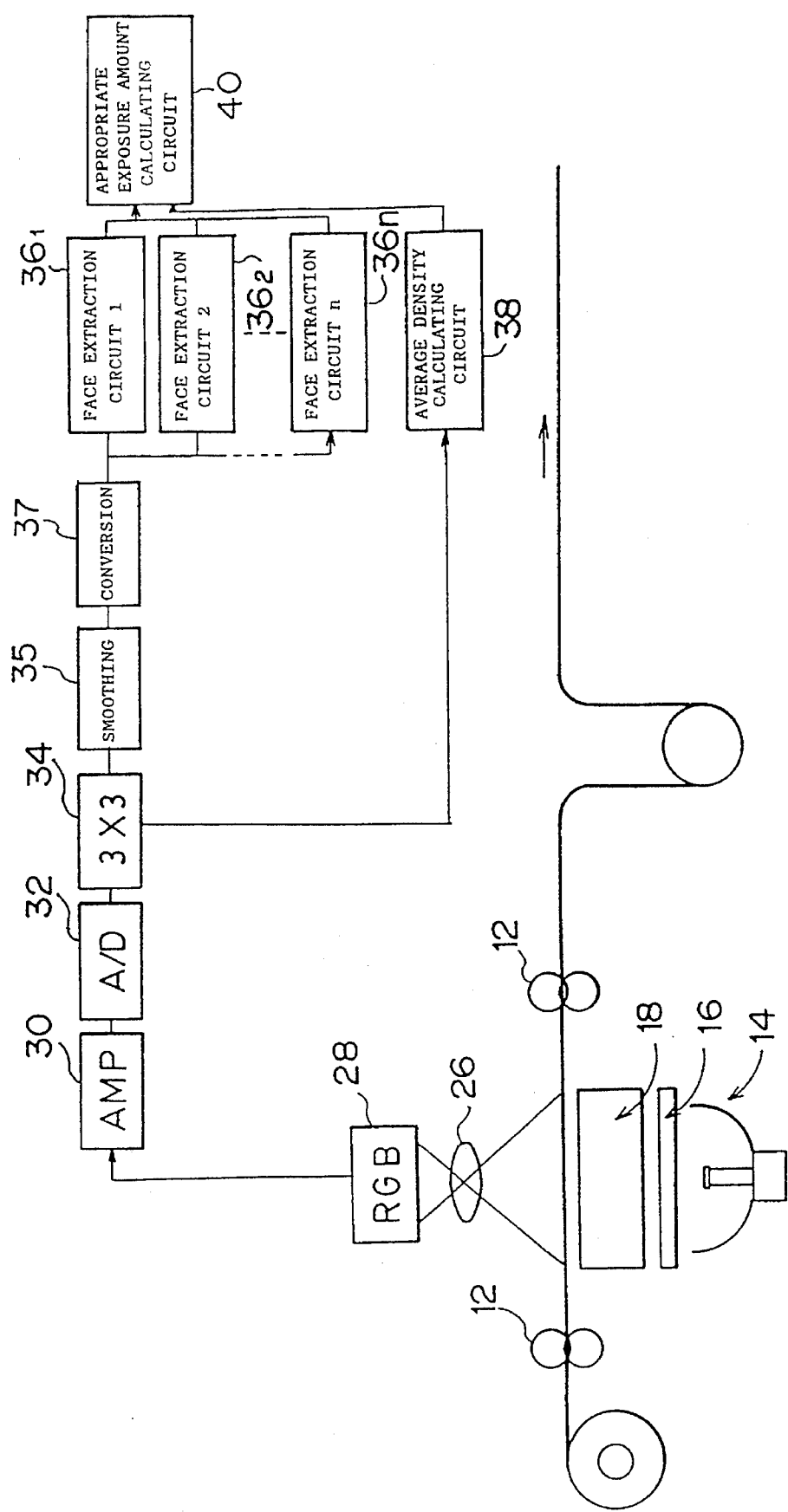
FIG. 21 is a schematic view of an exposure amount calculating device which effects parallel processing by a plurality of face extraction circuits.

In FIG. 21, the face extracting circuit of FIG. 20 is formed of a plurality of face extracting circuits $36_1, 36_2 \ldots 36_n$ so that the exposure amount is calculated by parallel processing. The face extracting circuits $36_1, 36_2 \ldots 36_n$ read the image in accordance with the time chart in FIG. 11, calculate the exposure amount, and output the results. A detailed explanation of this time chart is included in the first embodiment and will therefore be omitted here.

Other than the determination of the amount of exposure for a photographic printing device, the present invention can also be used to determine the amount of exposure of a digital color printer, to determine copy conditions of a copier, to determine the amount of exposure of a camera, to determine the display conditions of a CRT image, and to determine the amount of light when a hard copy is prepared from magnetic image data.

What is claimed is:

1. A color data conversion device for an image processing apparatus comprising:

color data outputting means for dividing a color original image into a plurality of pixels, breaking down each of the pixels into three colors of red light, green light and blue light, photometrically measuring the red light, green light and blue light, and outputting color data of the three colors;

calculating means for standardizing at least two color data, and outputting standardized color data;

lightness conversion means for calculating a lightness value on the basis of color data of the three colors, and outputting the lightness value;

saturation conversion means, provided with a saturation table expressing relationships between the standardized color data and saturation values of the pixels, for outputting saturation values corresponding to inputted standardized color data; and hue conversion means, provided with a hue table expressing relationships between the standardized color data and hue values of the pixels, for outputting hue values corresponding to inputted standardized color data.

2. A color data conversion device for an image processing apparatus according to claim 1, wherein said calculating means effects standardization at a value which is a predetermined multiple of the lightness value.

3. A color data conversion device for an image processing apparatus according to claim 1, wherein an amount of standardized color data inputted into said saturation table is less than an amount of standardized color data inputted into said hue table.

4. A color data conversion device for an image processing apparatus according to claim 1, wherein the color data standardized by said calculating means is color data of green light and blue light.

5. A color data conversion device for an image processing apparatus according to claim 1, wherein a storage capacity of said hue table is greater than a storage capacity of said saturation table.

6. A color data conversion device for an image processing apparatus according to claim 5, wherein the storage capacity of said hue table is 10 or more times greater than the storage capacity of said saturation table.

* * * * *